(12) United States Patent
Ohba et al.

(10) Patent No.: US 8,113,953 B2
(45) Date of Patent: Feb. 14, 2012

(54) IMAGE-LINKED SOUND OUTPUT METHOD AND DEVICE

(75) Inventors: Akio Ohba, Kanagawa (JP); Hiroyuki Segawa, Kanagawa (JP); Akira Suzuki, Tokyo (JP); Katsu Saito, Saitama (JP); Tomokazu Kake, Tokyo (JP); Shinichi Honda, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 625 days.

(21) Appl. No.: 12/294,966

(22) PCT Filed: Apr. 23, 2007

(86) PCT No.: PCT/JP2007/000441
§ 371 (c)(1), (2), (4) Date: Dec. 23, 2008

(87) PCT Pub. No.: WO2008/004331
PCT Pub. Date: Jan. 10, 2008

(65) Prior Publication Data
US 2010/0222144 A1    Sep. 2, 2010

(30) Foreign Application Priority Data
Jul. 6, 2006    (JP) .................................. 2006-186797

(51) Int. Cl.
*A63F 13/00* (2006.01)
*A63F 13/06* (2006.01)
(52) U.S. Cl. ................. 463/35; 463/36; 463/37; 463/39
(58) Field of Classification Search .................... 463/31, 463/35, 36, 37, 39
See application file for complete search history.

(56) References Cited

U.S. PATENT DOCUMENTS

| | | | |
|---|---|---|---|
| 6,522,395 | B1 | 2/2003 | Bamji et al. |
| 6,714,660 | B1 | 3/2004 | Ohba |
| 2004/0130637 | A1 | 7/2004 | Kake et al. |
| 2004/0240740 | A1 | 12/2004 | Ohba |

(Continued)

FOREIGN PATENT DOCUMENTS

JP    5232908 A    9/1993

(Continued)

OTHER PUBLICATIONS

International Search Report for corresponding PCT Application PCT/JP2007/00044, dated Jun. 19, 2007.

(Continued)

*Primary Examiner* — Evan Pert
(74) *Attorney, Agent, or Firm* — Matthew B. Dernier, Esq.; Gibson & Dernier LLP

(57) ABSTRACT

A player can be notified both visually and aurally that his/her action is recognized. A velocity vector-calculating unit calculates a velocity vector of the movement of an object manipulated by a player moving toward an assumable contact surface W by using an image of the movement of the player captured by a camera. A travel time calculating unit calculates the travel time required for the object to reach the contact surface W by using the velocity vector and a distance between the object and the contact surface W. A lag time acquisition unit acquires a lag time that sound output from a speaker takes to reach the player. A sound control unit allows the player to hear the sound substantially at the same time the object contacts the contact surface by outputting a predetermined sound after the time passes which is obtained by subtracting the lag time from the travel time.

7 Claims, 22 Drawing Sheets

U.S. PATENT DOCUMENTS

2005/0025318 A1    2/2005    Sadaie et al.

FOREIGN PATENT DOCUMENTS

| JP | 08055235 A | 2/1996 |
| JP | 2003085571 A | 3/2003 |
| JP | 2004500657 A | 1/2004 |
| JP | 2004166246 A | 6/2004 |
| JP | 200551660 A | 2/2005 |
| JP | 2005031799 A | 2/2005 |
| WO | 9960522 A1 | 11/1999 |

OTHER PUBLICATIONS

International Preliminary Report on Patentability for corresponding PCT Application PCT/JP2007/000441, dated Jan. 6, 2009.

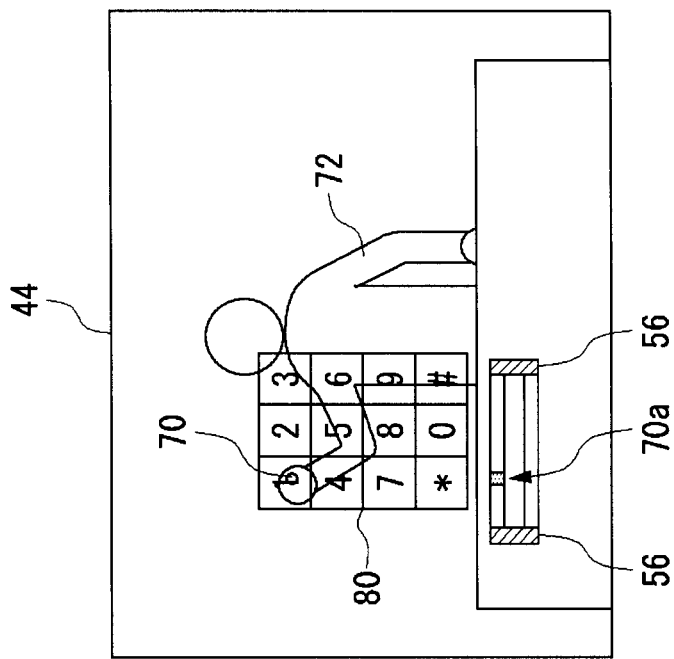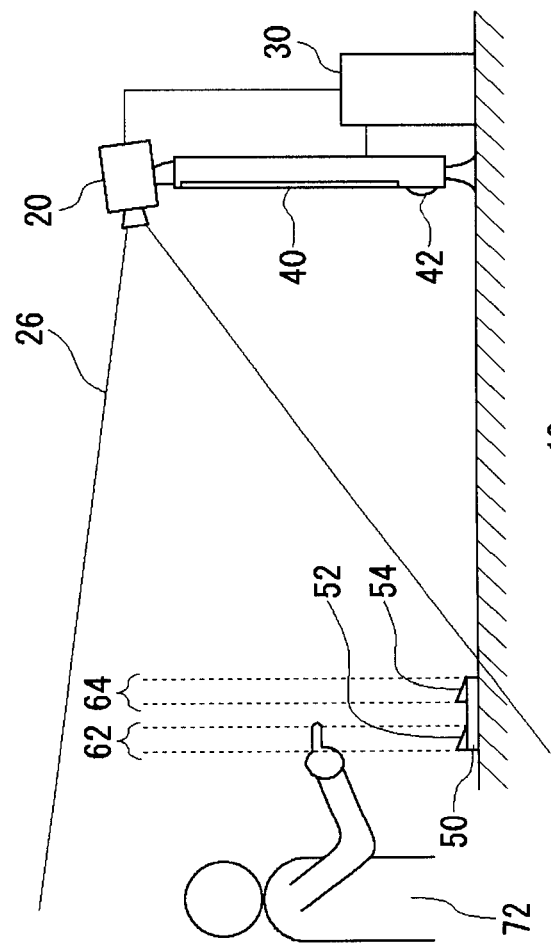

IMAGE-LINKED SOUND OUTPUT METHOD AND DEVICE

BACKGROUND OF THE INVENTION

1. Field of the Invention

The present invention relates to techniques used to output a sound accompanying the movement of an object manipulated by a player.

2. Description of the Related Art

Image processing devices that allow command input and game play by capturing the movements of players using image capturing devices such as video cameras and then by showing moving images of players on a display are conventionally known. In such image processing devices, commands can be input by the player's moving image touching a menu-screen picture or an object, which are shown on a screen, in a screen picture. In other words, the moving image of the player functions as an input interface.

In applications including games in which a moving image of a player are used as input interfaces as described above, it is important to prompt the movement of the player who manipulates an application on its own by using visual effects on a screen or by sounds. If the player is required to move unnaturally, the player's interest in the application may be lost.

SUMMARY OF THE INVENTION

In this background, a general purpose of the present invention is to provide a technique that achieves a player-friendly interface in a device in which the movement of a player is used as an input interface.

An aspect of the present invention relates to an image-linked sound output method comprising: calculating the travel time required for an object manipulated by a player to reach a contact surface, based on an image captured by a camera; and adjusting a time to output a sound by referring to the travel time in order for a player to hear the sound substantially at the same time as the object touches the contact surface.

According to the present aspect, before the object reaches a virtual or a real contact surface, the time the object takes to reach the contact surface is calculated, and a sound is output in consideration of a sound lag. With this, the player may be notified both visually and aurally that his/her action is recognized. Also, the difference between the time at which the player recognizes visually and the time at which the player hears the sounds may be reduced, and the player may feel more satisfied.

Another aspect of the present invention relates to an image-linked sound output device. This device comprises: a velocity vector calculating unit operative, to calculate a velocity vector of the movement of an object manipulated by the player moving toward a contact surface by using an image of the movement of a player captured by a camera; a travel time calculating unit operative to calculate a travel time required for the object to reach the contact surface by using the velocity vector and a distance between the object and the contact surface; a sound control unit operative to output from a speaker a predetermined sound when the object contacts the contact surface; and a lag time acquisition unit operative to acquire a lag time the sound output from the speaker takes to reach the player. The sound control unit allows, based on the time obtained by subtracting the lag time from the travel time, the player to hear the sound substantially at the same time the object contacts the contact surface.

Implementations of the invention in the form of methods, systems, computer programs, and recording mediums storing computer programs may also be practiced as additional modes of the present invention.

According to the present invention, a player can be notified both visually and aurally that his/her action is recognized.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 7A is a diagram showing the positional relation between an object and an access area, and FIG. 7B is a diagram showing the screen picture recognized by a player on a display;

Figure 1:
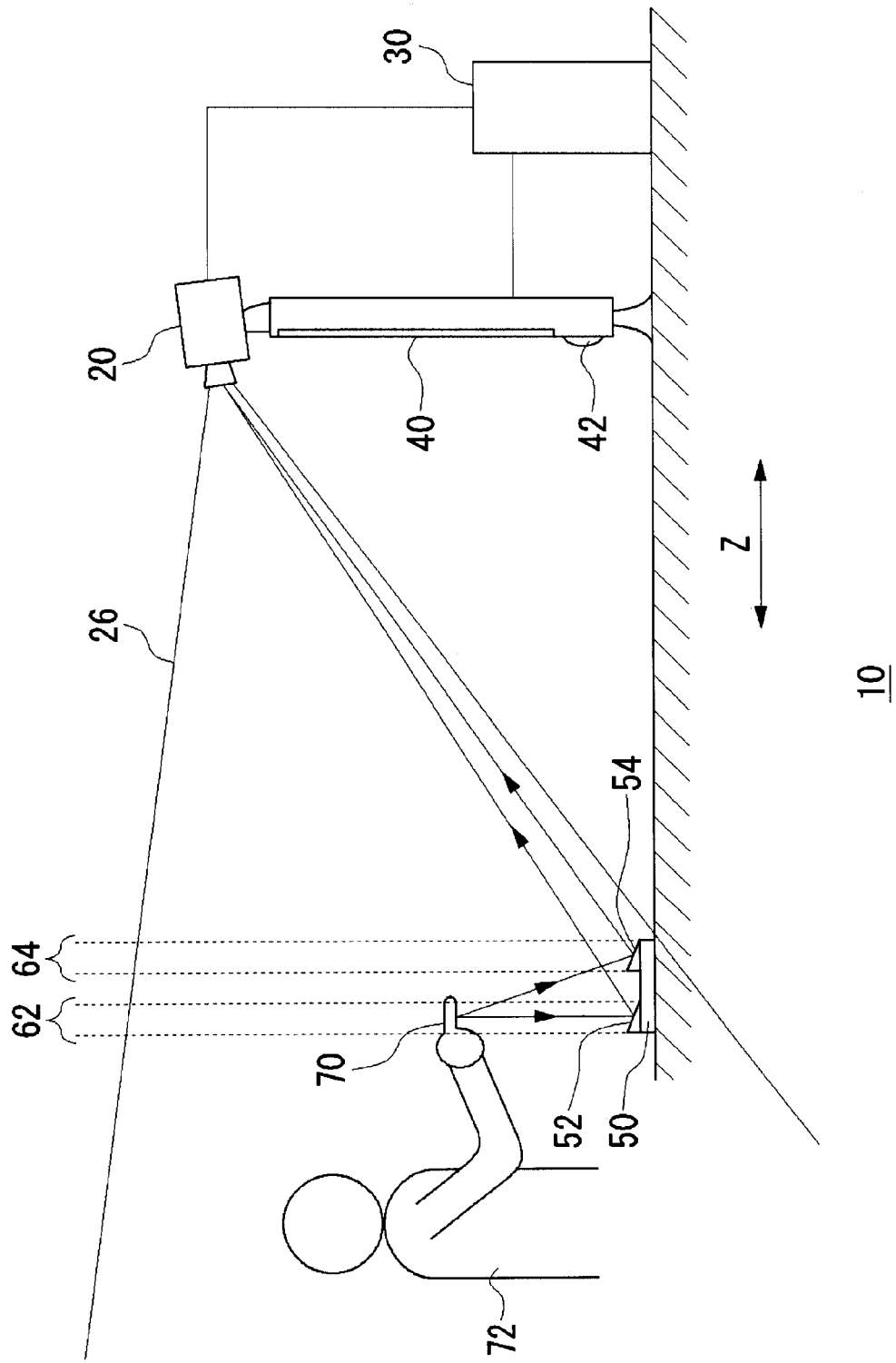
FIG. 1 is a diagram showing the whole configuration of a three-dimensional position-specifying device according to the embodiment 1.

REFERENCE NUMERALS 10 three-dimensional position-specifying device
20 camera
22 image sensor
24 image processing unit
30 image processing device
34 image output unit
36 sound output unit
40 display
42 speaker
50 reflector
52 first reflection surface
54 second reflection surface
56 marker
62 first access area
64 second access area
70 object
70a reflected image
70b reflected image
72 player
74 object
75 trajectory
76 object
80-84 application image
110 three-dimensional localization unit
112 reflection surface area-specifying unit
114 in-frame localization unit
120 reference image memory unit
122 depth localization unit
132 action specifying unit
134 display control unit
150 image-linked sound control unit
154 lag time acquisition unit
156 travel time calculating unit
158 sound synchronizing unit
160 velocity vector calculating unit
170 reflector
172 first reflector
174 second reflector
176 marker
180 area to be cropped
182 access area

DETAILED DESCRIPTION OF THE INVENTION

Embodiment 1

FIG. 1 shows the whole configuration of a three-dimensional position-specifying device 10 according to an embodiment of the present invention. The three-dimensional position-specifying device according to the embodiment captures an image of the object that a player manipulates by using an individual camera, specifies the three-dimensional position of the object by image processing, and displays a screen picture corresponding to the specified three-dimensional position.

A typical example of the application that uses the three-dimensional position-specifying device 10 is an action game in which, for example, characters displayed on the screen are manipulated by the movement of a player. However, the three-dimensional position-specifying device 10 can also be applied to, for example, other types of games, simple business applications, album displays of digital pictures, and applications for music data reproduction.

The three-dimensional position-specifying device 10 is provided with a display 40, a camera 20 installed on the upper side of the display, an image processing device 30, and a reflector 50.

The display 40 is preferably installed in front of a player 72. The player 72 manipulates the object while looking at the image of the player captured by the camera 20.

The camera 20 captures the image of the object 70 manipulated by the player 72 and outputs a frame to the image processing device 30 at a predetermined frame rate. In order to accelerate the image detection response time, the highest possible frame rate is preferred. The camera 20 is installed on the upper side of the display 40. An image capturing range 26 of the camera 20 is set so as to capture at least the object 70 manipulated by the player 72. With this, the player 72 can manipulate the object 70 while facing to the display 40. However, in accordance with the feature of the application executed by the three-dimensional position-specifying device 10, the camera 20 may be installed on the lower side or lateral side of the display 40 or installed in the direction different from the direction the player 72 faces.

The frames output from the camera 20 are displayed on the display 40 via the image processing device 30. In this case, the captured frame undergoes a mirror imaging process by the image processing device 30, and a mirror image of the player 72 is displayed on the display 40, preferably. For example, when the player raises his/her hand, the image of the player in a screen picture raises the same hand as if the image were reflected in a mirror. Thus, the player can easily recognize his/her own movement. However, the captured picture may be displayed on the display 40 without undergoing the mirror imaging process by the image processing device 30. The picture that is inverted upside down by the image processing device 30 may be displayed on the display 40 in accordance with the feature of the application executed by the three-dimensional position-specifying device 10.

The image processing device 30 has a function of loading and executing application software stored in external storage media. In addition to performing the above stated mirror imaging process on the frame output from the camera 20, the image processing device 30, for example, detects the images of the object in a frame, superimposes and displays a predetermined image on the object, and gives an instruction to the application in accordance with the action of the player. The mirror image on which the predetermined process had been performed by the image processing device 30 is output to the display 40. The image processing device 30 is typically a specialized machine such as a game console; however, it may be, for example, a general-purpose personal computer or server having the functionality of inputting and outputting images. The detailed functions and configurations of the image processing device 30 will follow.

The display 40 may be provided with a speaker 42. The speaker 42 plays, for example, a sound and accompaniment output by the image processing device 30 in conjunction with objects and other images displayed on the display 40. Preferably, the speaker 42 is integral with the display 40 and installed near the display 40. However, the speaker 42 and the display 40 may not be integral with each other or installed remotely.

The reflector 50 is installed between the player 72 and the display 40 and camera 20, and it has the role of allowing the reflected image of the object 70 to be captured by the camera 20. In the specification, an "object" is a collective term used for what is manipulated by the player 72 in an image capturing range of the camera 20 and the "object" includes a part of the body (e.g., a head, an arm, a hand, a foot, and a mouth) of the player and an object (e.g., a bar, a piece of sheet, and a box) and a device (e.g., a controller) that are manipulated by a part of the body of the player (e.g., a hand, a foot, and a mouth). In the specification, the state of the object moved by the player, including when the object is a part of the player's body, is expressed by, for example, "object manipulated by a player". In FIG. 1, as an example, a finger of the player is shown as the object 70.

The reflected image of the object 70 output by the reflector 50 is captured by the camera 20 simultaneously as the direct image of the object 70 is captured by the camera 20. In other words, the camera 20 includes both a direct image and reflected image of the object 70 in one frame. Capturing the image of the object 70 as an image from two perspectives, a direct image and a reflected image, the three-dimensional position of the object 70 can be specified using the images from an individual camera as will hereinafter be described. To simplify the explanation, only one object 70 is manipulated by the player 72 in the following explanation, not to mention that the same process can be performed in the case with two or more objects 70.

The reflector 50 is provided with two reflection surfaces 52 and 54. Each reflection surface reflects the object and the reflected image is captured by the camera 20. Therefore, the reflection surfaces 52 and 54 have predetermined angles so that the reflected image of the object 70 can be perceived by the lens of the camera 20. A predetermined distance from the camera 20 is required for the position used for installing the reflector 50.

As shown in FIG. 1, access areas 62 and 64, in which the reflected image of the object 70 can be projected to the camera 20, are extended upward from the reflection surfaces 52 and 54, respectively. The widths of the access areas 62 and 64 are determined by the angles of the inclination of the reflection surfaces 52 and 54 and in the range where the object 70 is expected to enter. In the example of FIG. 1, the access areas 62 and 64 are set so as not to cross over each other. Therefore, when the object 70 is in the access area 62, the reflected image from the reflection surface 52 is captured by the camera 20, and when the object 70 is in the access area 64, the reflected image from the reflection surface 54 is captured by the camera 20. However, if the object 70 has a certain length in the direction of the depth of the reflector 50 as a finger or a bar, the object 70 can be in both access areas 62 and 64 simultaneously.

Generally, when the movement of the object is to be detected based on the differences between the frames, it is difficult to detect the movement in a direction substantially parallel to the optical axis of the camera (z direction in FIG. 1) since the differences between the frames are very minute. Accordingly, in the embodiment, the image of the object from the direction different from that of the direct image is acquired by using the reflection by the reflector 50 so that the movement of the object in a z direction can be detected steadily using the reflected image. The direction parallel to the optical axis of the camera is hereinafter referred to as "depth direction".

Figure 2:
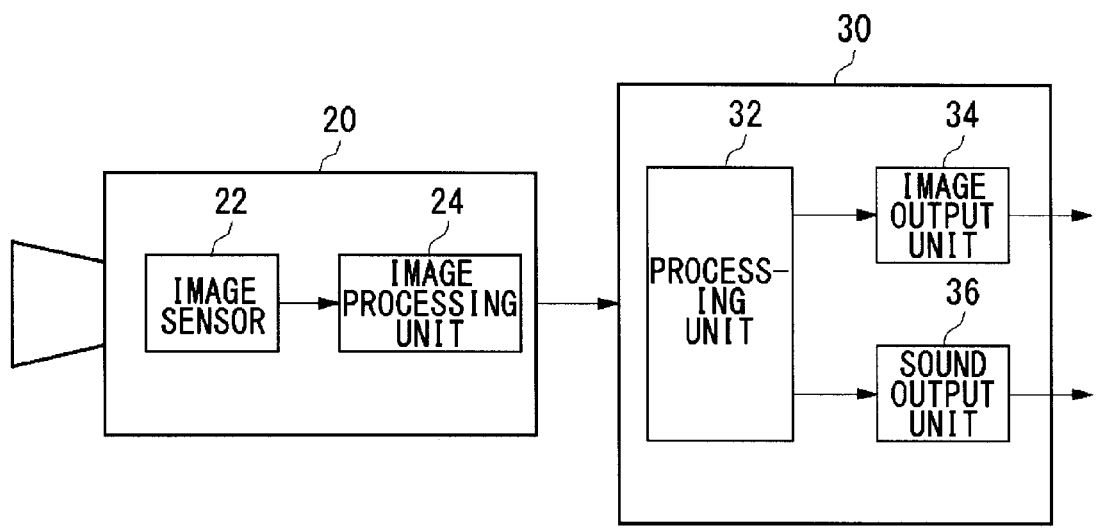
FIG. 2 is a diagram showing simplified configurations of hardware of both a camera and an image processing device.

FIG. 2 is a diagram showing simplified hardware configurations of the camera 20 and the image processing device 30. The camera 20 is provided with an image sensor 22 as an image pickup element and an image processing unit 24. The image sensor 22 is generally a CCD sensor or a CMOS sensor and records an image by having the image perceived by a lens (not shown) captured by the light receiving element. The captured image is temporarily stored in a memory such as RAM (not shown). Since the configuration of the camera 20 is well known, the further description thereof is omitted.

The image processing unit 24 comprises a circuit such as ASIC and performs the necessary processes on the image data output from the image sensor 22 such as A/D conversion, demosaicing, white balance, noise reduction, contrast enhancement, color correction, and gamma control. The image data processed by the image processing unit 24 is forwarded to the image processing device 30 via a communication interface (not shown). In the following description, to simplify the explanation, the image data to be forwarded to the image processing device 30 from the image processing unit 24 is RAW data that is a digitalized output signal from the image sensor 22; however, the image data may take other formats, for example, compressed data such as JPEG. In the latter case, an image decoding unit for decoding the compressed data is placed before the processing unit 32 in the image processing device 30.

The image processing device 30 includes a processing unit 32, an image output unit 34 that outputs image data sent from the processing unit 32 to the display 40, and a sound output unit 36 that outputs sound data sent from the processing unit 32 to a speaker 42. The image processing device 30 is further provided with a load unit that reads out application software stored in an arbitrary recording medium including a CD-ROM, a DVD-ROM flash memory, and an application execution unit that executes a predetermined application in accordance with software. Since specialized machines and personal computers normally have these features, the further description thereof is omitted.

Figure 3:
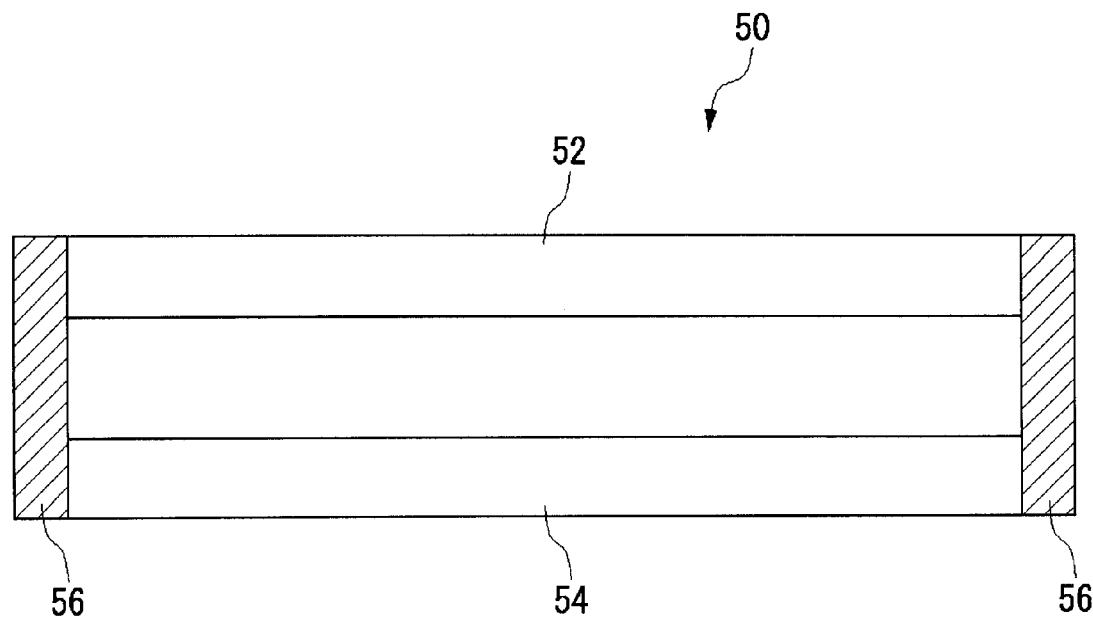
FIG. 3 is a plain view showing the structure of a reflector.

FIG. 3 is a plain view showing the structure of a reflector 50. The reflector 50 is lamellar as a whole and, as mentioned above, has the first reflection surface 52 and second reflection surface 54 that are positioned apart from each other in the depth direction. An example of the reflection surfaces 52 and 54 is a mirror. The reflection surfaces 52 and 54 may be, for example, a mirror-finished metal or plastic, or a glass onto which a metal is evaporated. The first reflection surface 52 and the second reflection surface 54 are positioned parallel to each other so that the longer axis is substantially perpendicular to the optical axis of the camera 20. As shown in FIG. 1, the first reflection surface 52 and the second reflection surface 54 are set at the angle so that an object above the reflection surfaces is reflected and so that the reflected image is projected to the lens of the camera 20.

A marker 56 for the recognition of the position of the reflector 50 by the image processing device 30 is placed on each end of the longer axis of the reflector 50. The marker 56 may be a colored part, may be in predetermined patterns such as a check pattern, or may be a two-dimensional code. A light source, such as a LED, may be embedded on the each end. In a word, as long as the information necessary for specifying the position of the reflector 50 within a frame output by the camera 20 can be provided, the marker can take any configuration.

Having a predetermined width in the depth direction and being provided with a plurality of reflection surfaces, the reflector 50 permits a plurality of access areas 62 and 64 to be set in the depth direction. Each of the reflection surfaces 52 and 54 projects to the camera 20 the reflected images of the different access areas where the object is assumed to enter and allows the camera 20 to capture the reflected images of the object. With this, as will hereinafter be described in detail, the displacement of the object in the depth direction can be detected.

Figure 4:
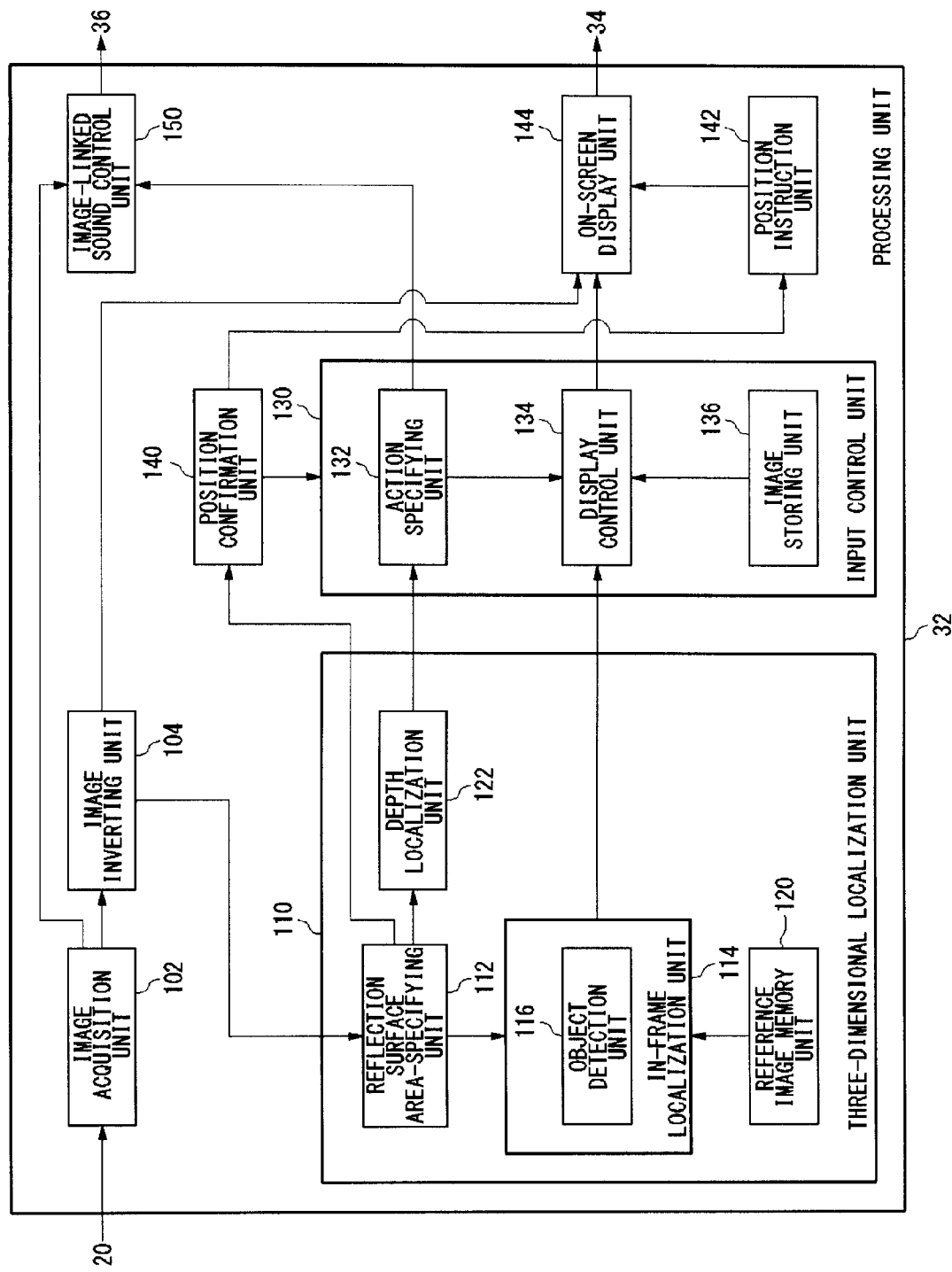
FIG. 4 is a diagram showing the detailed configuration of a processing unit.

FIG. 4 is a diagram showing the detailed configuration of a processing unit 32. The configuration is implemented by a CPU, a memory, a program or the like loaded into the memory. FIG. 4 depicts functional blocks implemented by the cooperation of those components. Therefore, it will be obvious to those skilled in the art that the functional blocks may be implemented in a variety of manners by a combination of hardware and software.

An image acquisition unit 102 acquires the frames output by the camera 20 one at a time and sends the frames to an image inverting unit 104 and an image-linked sound control unit 150.

The image inverting unit 104 performs a mirror imaging process (i.e., a right and left inversion process of an image) on the frame received from the image acquisition unit 102 and creates a mirror image. The mirror image is then sent to a three-dimensional localization unit 110 and an on-screen display unit 144.

The three-dimensional localization unit 110 specifies a three-dimensional position of the object by using the frames captured by the camera 20 received from the image inverting unit 104. The three-dimensional position is the position of the object in a frame, in other words, the two-dimensional position corresponding to the position in a screen picture, and also the position in the depth direction (i.e. the position in the z-direction). In the embodiment, the object in the screen picture is recognized by specifying the two-dimensional position of the object, and the specific action of the player is detected by specifying the position in the depth direction of the object.

The three-dimensional localization unit 110 includes a reflection surface area-specifying unit 112, a depth localization unit 122, an in-frame localization unit 114, and a reference image memory unit 120.

The reflection surface area specifying unit 112 specifies, from the frame captures by the camera 20, the reflection surface area that is the area corresponding to the first reflection surface 52 and second reflection surface of the reflector 50. The reflection surface area-specifying unit 112 detects two markers 56 from the frame and specifies the area between these markers as the reflection surface area.

The depth localization unit 122 specifies the position of the object in the depth direction by detecting the reflected image from the reflection surface area specified by the reflection surface area specifying unit 112. Specifically, the depth localization unit 122 compares the reflection surface areas in a plurality of frames and then detects the differences. When no reflection image is reflected in the reflection surface area in a given frame, but the reflection image is reflected in the reflection surface area in a subsequent frame, it can be determined that the object is positioned in the access area corresponding to the reflection surface.

In order to make this determination without fail, it is necessary to be able to clearly differentiate the reflected image of the object on the first reflection surface 52 and second reflection surface 54 from any other images. Therefore, in an exemplary embodiment, the depth localization unit 122 acquires a default image of the reflection surface area before starting a process of specifying the three-dimensional position. If any difference is detected between the default image and the reflection surface area of an arbitrary frame, it may be determined that the object is positioned in the access area.

The depth localization unit 122 determines whether the object has entered in either the first access area 62 and second access area 64 by performing the same process with respect to the reflection surface areas corresponding to the first reflection surface 52 and second reflection surface 54. The determination result is sent to an input control unit 130.

The in-frame localization unit 114 specifies the position of the object in the frame. The in-frame localization unit 114 includes an object detection unit 116. The object detection unit 116 performs a well-known pattern matching function on the frame received from the image inverting unit 104 using a reference image (template) of the object so as to specify the position of the object in the frame. The subject on which the matching is performed may be the frame itself received from the image inverting unit 104 or the reflection surface area specified by the reflection surface area specifying unit 112, which is removed from the frame.

The reference image memory unit 120 stores the reference image for specifying the object. The reference image prepared beforehand for the object, whose position in the frame is to be specified, may be stored. Also, as will hereinafter described in detail, an image of the object to be specified may be captured by the camera 20, and then the area where the object is assumed to be may be cut out from the frame and stored as a reference image in the reference image memory unit 120. In the former case, for example, if the object is a hand, the reference image created by averaging images of hands of tens or thousands of people may be stored, or a plurality of reference images categorized in accordance with the player's age, gender, and body type may be stored. An arbitrary matching technique using reference images can be used. Since the matching technique using reference images is well known to those skilled in the art, the explanation thereof is omitted.

The information of the position of the object in the frame specified by the in-frame localization unit 114 is provided to an input control unit 130.

The input control unit 130 gives an instruction to a non-illustrated application execution unit that executes applications including games based on the information obtained by processing the image of the frame captured by the camera 20. The input control unit 130 includes an action specifying unit 132, a display control unit 134, and an image storing unit 136.

The action specifying unit 132 specifies the action of the player by detecting the displacement of the object 70 in the depth direction between the first access area 62 and the second access area 64 based on the determination on the position in the depth direction by the depth localization unit 122. The action specifying unit 132 may specify the displacement of the object 70 toward the camera 20 and away form the camera 20 in the depth direction as different actions of the player. The action specifying unit 132 provides the specified action to the non-illustrated application execution unit and the display control unit 134. The application execution unit receives the provided action as an input and provides a predetermined function.

The display control unit 134 superimposes on the direct image of the object captured by the camera 20 and displays on a display the image to be displayed in order to achieve a predetermined purpose. The display control unit 134 may display images in different display modes when the object is positioned in the first access area 62 corresponding to the first reflection surface and when the object is positioned in the second access area corresponding to the second reflection surface. The display control unit 134 searches the image corresponding to the position of the object from the image storing unit 136 and outputs to the on-screen display unit 144.

The image storing unit 136 stores the foregoing image displayed being superimposed on the direct image of the object. Examples of the image are characters used for a game, pointers such as a cursor, tools such as a musical instrument or a weapon, marks such as a star or a sun, images of a part of a body such as a hand or a foot, and input devices such as a keyboard or a calculator. These images may be images for input that an OS has in order to receive an input form a user or may be application images read out from application software that is running. In order to have the images in different modes corresponding to the position of the object in the frame displayed by the display control unit 134, the image storing unit 136 may keep the images in a plurality of modes or may keep the data required for changing a given image.

The on-screen display unit 144 displays the image output from the display control unit 134 on the screen over the mirror image obtained from the image inverting unit 104 and sends the image to the image output unit 34. The image superimposed on the mirror image of the player is displayed on the display 40 by the image output unit 34.

The image-linked sound control unit 150 controls the sound output unit 36 so that the sound, in association with the position of the object detected by the three-dimensional localization unit 110, and the action of the player, detected by the input control unit 130 are output. The concrete configuration of the image-linked sound control unit 150 will be explained in detail in the embodiments 3 and 4.

A position instruction unit 142 displays on the display 40, along with the image of the player captured by the camera 20, instructions of where the player should place the reflector 50. As described above, since the reflector 50 allows the reflected image of the object 70 to be captured by the camera 20, the location where the reflector 50 is to be placed is limited to a certain range. In order for the player to place the reflector 50 in the right position, for example, a frame border is displayed on the display 40 and the position of the reflector 50 can be adjusted so that the image of the reflector 50 captured by the camera 20 lies within the frame border.

Referring to the frame captured by the camera 20, a position confirmation unit 140 confirms whether the reflector 50 is placed in the appropriate position. Specifically, the reflection surface area-specifying unit 112 detects the position in the frame of the markers 56 placed on each end of the reflector 50 and the position confirmation unit 140 determines whether the markers 56 are positioned within the frame border displayed by the position instruction unit 142. When the markers are determined to be within the frame border, the position confirmation unit 140 displays on the display 40 the display indicating that the reflector is placed appropriately and gives an instruction for terminating the display of the frame border to the position instruction unit 142. It may be configured so that the localization process is not started by the three-dimensional localization unit 110 until the markers enter inside of the frame border.

Referring to FIG. 5 through FIG. 8, an example of the application using the three-dimensional position-specifying device according to the embodiment is described in detail in the following. The application is a calculator, and a number can be input by a player pushing the image of a key of the calculator displayed on the screen.

Figure 5B:
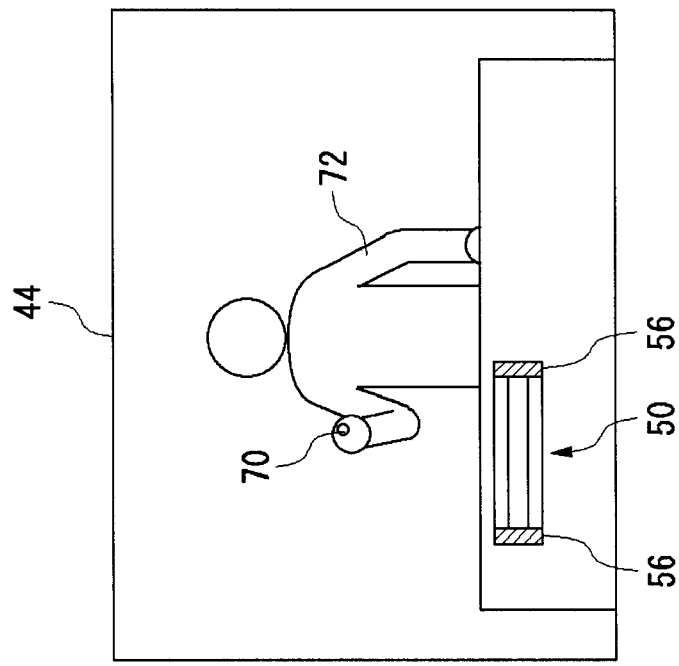
FIG. 5B is a diagram showing the screen picture recognized by a player on a display.
Figure 5A:
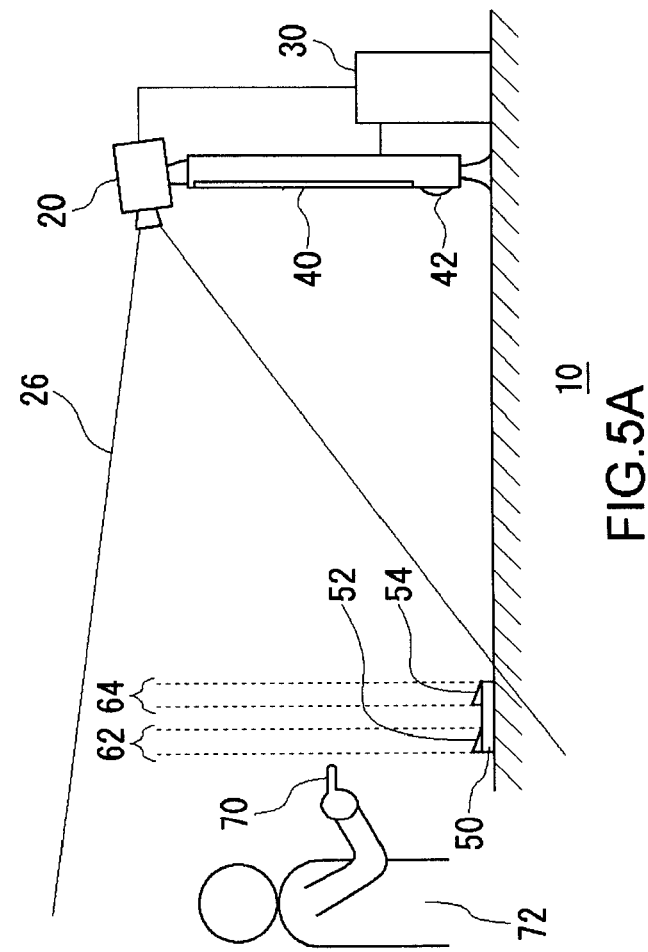
FIG. 5A is a diagram showing the positional relation between an object and an access area.

FIG. 5A shows the state in which the object 70 manipulated by a player 72, that is, the finger of the player, is positioned in the front side of the first access area 62 that is extended above the first reflection surface 52 of the reflector 50. This is the state in which the application that will be executed by the image processing device 30 is on standby for any action of the player. FIG. 5B shows a screen 44 that is displayed on the display 40 and recognized by the player. As shown in the figure, the direct images of the player 72, object 70, and reflector 50 are displayed on the screen 44. The reflection surface area-specifying unit 112, by detecting the markers 56 from the frame, specifies a reflection surface area 50'.

The default image of the reflection surface area 50' may be stored while the camera 20 and the image processing device 30 are on standby after being switched on. During standby, there is nothing but background shown above the first access area 62 and second access area 64. Having the default image stored, when an object enters the first access area 62 and the second access area 64, the differences in the images can be easily detected. Thus, the process of detecting the reflected image of the object in the reflection surface area becomes robust.

In the conventional object detection method using the differences of the displacement in frames, when the object stays still on the screen, nothing can be detected since there is no difference in frames. Contrarily, in the case of storing the default image beforehand as described in the embodiment, even when the object stays still while in the access area, the differences from the default image can be detected continuously. Thus, the position of the object in the depth direction can stay recognized.

Figure 6B:
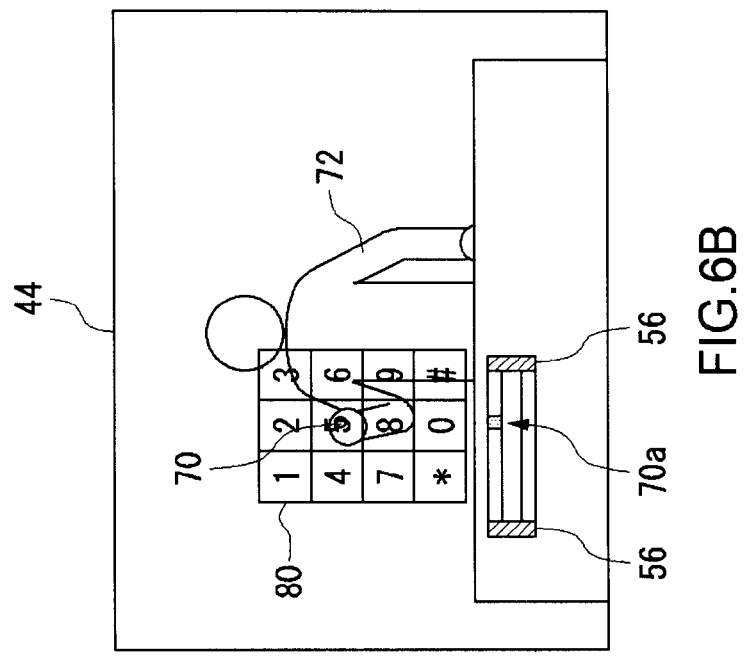
FIG. 6B is a diagram showing the screen picture recognized by a player on a display.
Figure 6A:
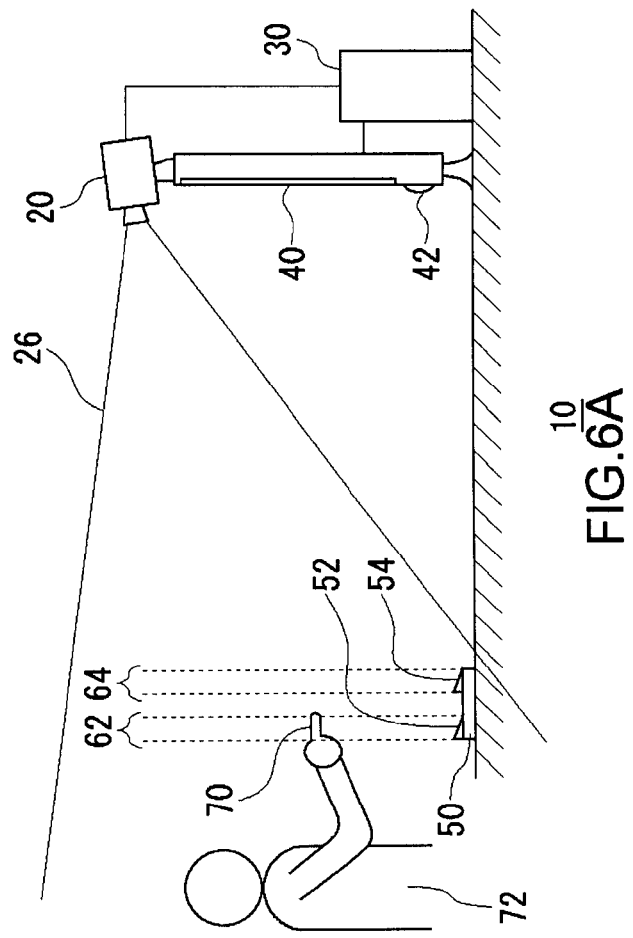
FIG. 6A is a diagram showing the positional relation between an object and an access area.

FIG. 6A shows the state in which the object 70 manipulated by a player 72 is in the first access area 62. FIG. 6B shows a screen 44 that is shown on the display 40 and recognized by the player. Due to the object 70 entering the first access area 62, a reflected image 70a of the object 70 is reflected in the area corresponding to the first reflection surface 52 in the screen 44. The depth localization unit 122 detects the reflected image 70a by taking the differences of the reflection surface areas in frames.

Being aware of the entry of the object 70 in the access area 62, the action specifying unit 132 gives instruction to the display control unit 134 so that an application image 80 for executing the calculator application is displayed on the display 40. The application image 80 includes a plurality of key areas for the input of numbers or symbols. Preferably, the application image 80 is a line image or a translucent image so that the visibility of the movement of the player superimposed is not disturbed. However, the image may be opaque. The action specifying unit 132 also instructs a non-illustrated application execution unit to run the calculator application. After this, the in-frame localization unit 114 continues to track the object 70 by specifying the position of the object 70 in the frame by matching. In FIG. 6B, the object 70 is located at the position of the key that corresponds to "5" in the application image 80.

FIG. 7A shows the state in which the player 72 moved the object 70 in the first access area 62, in other words, in the plane perpendicular to the depth direction. FIG. 7B shows a screen 44 that is displayed on the display 40 and recognized by the player. As shown in FIG. 7B, the player 72 moved the object 70 from the position of "5" to that of "1" in the application image 80. In accordance with this change, the position of the reflected image 70a of the object has also changed in the reflection surface area. Since the object is still in the first access area 62, no instruction is given by the action specifying unit 132; thus, the aspect of the application image 80 does not change. The in-frame localization unit 114 continues to track the object 70 so as to determine whether the object 70 is located at any key in the application image 80.

Figure 8B:
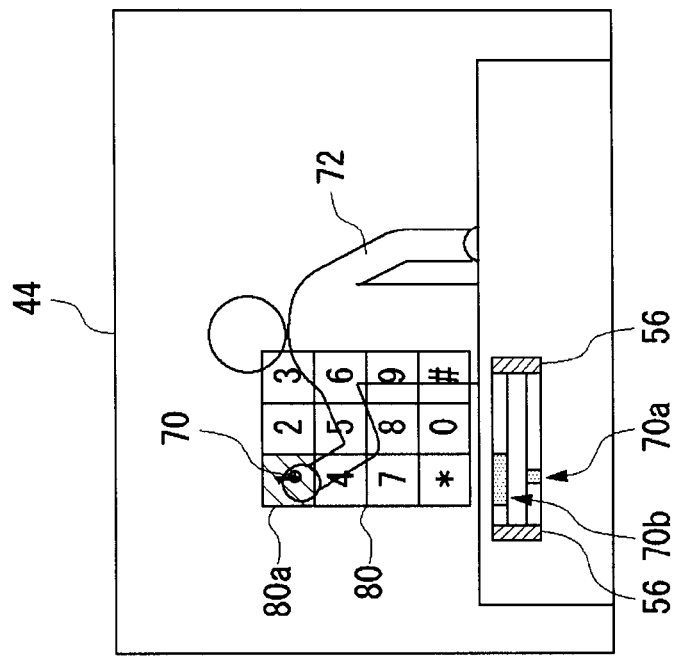
FIG. 8B is a diagram showing the screen picture recognized by a player on a display.
Figure 8A:
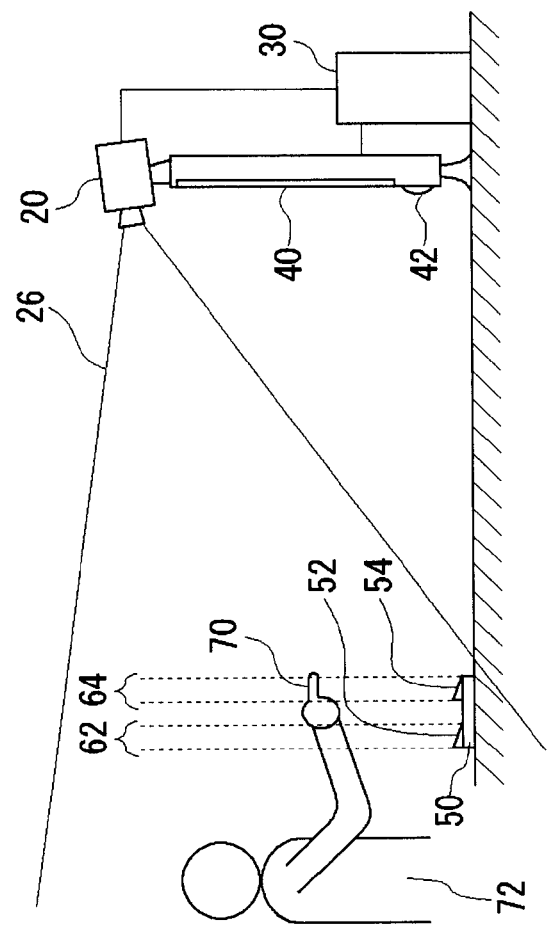
FIG. 8A is a diagram showing the positional relation between an object and an access area.

FIG. 8A shows the state in which the object 70, manipulated by a player 72, passed the first access area 62 and entered the second access area 64. FIG. 8B shows a screen 44 that is displayed on the display 40 and recognized by the player. As shown in FIG. 8B, since the object 70 has entered in the second access area 64, the reflected image 70b reflected by the first reflection surface 52 is displayed at the position corresponding to the first reflection surface 52, and the reflected image 70a reflected by the second reflection surface 54 is displayed at the position corresponding to the second reflection surface 54. The depth localization unit 122 detects the reflected images 70a and 70b by taking the differences of the reflection surface areas in frames.

Based on the information from the depth localization unit 122, the action specifying unit 132 recognizes the fact that the object 70 passed the first access area 62 and entered the second access area 64 and also determines that the action of moving the object 70 toward the camera in the depth direction was taken by the player 72. In accordance with what is described above, the action specifying unit 132 notifies the application execution unit of the entry of the key, in other words, the fact that the key was pushed, in the application image 80 that corresponds to the current position of the object 70 in the frame. Along with this, the action specifying unit 132 instructs the display control unit 134 to change the display mode of the key in the application image 80 that corresponds to the current position of the object 70 in the frame. In the example in FIG. 8B, the color of the key "1" corresponding to the position of the object 70 in the frame is changed (see 80a in the figure). In addition to the change in color, the change in the display mode may include a key that blinks or is lit or a pushed key. As described above, the player can input numbers in the calculator application by manipulating the object. Similarly, a keyboard may be displayed as an application image and used as an input device of a word processor.

Following this, when the player 72 moves the object 70 back in the first access area 62, the action specifying unit 132 detects this action and determines that the selection of the key corresponding "1" in the application image 80 is cancelled.

The action specifying unit 132 instructs the display control unit 134 to change the display mode of the key corresponding to "1" back to the original mode.

When the player 72 moves the object 70 back in front of the first access area 62, that is, back to the state shown in FIG. 5A, the action specifying unit 132 detects this action and determines that the player has stopped using the calculator application. The action specifying unit 132 instructs both the application execution unit to stop the calculator application and the display control unit 134 not to display the application image 80. As described above, the screen picture returns to the state as the one shown in FIG. 5B.

Figure 9:
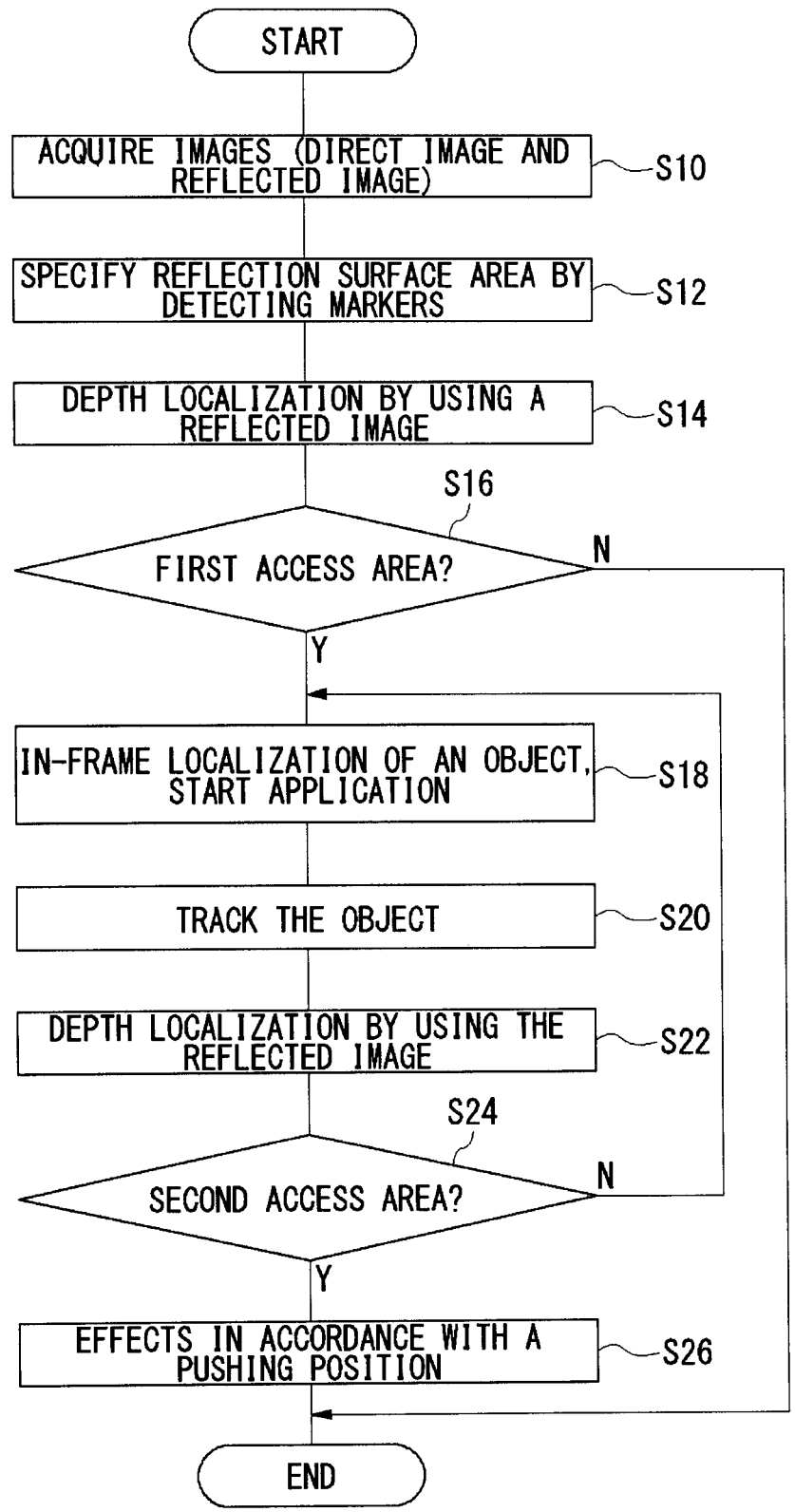
FIG. 9 is a flowchart for executing the applications explained in FIG. 5 through FIG. 8 in the three-dimensional position-specifying device in the embodiment 1.

FIG. 9 is the flowchart for executing the applications explained in FIG. 5 through FIG. 8 in the three-dimensional position-specifying device 10 in the embodiment.

After the reflector 50 is placed at the right position, the images of the object 70 and reflector 50 are captured by the camera 20 and the image acquisition unit 102 acquires the frame including the direct image and reflected image of the object 70 (S10). The reflection surface area-specifying unit 112, by detecting the markers 56 in the frame provided by the image inverting unit 104, specifies the reflection surface area (S12). The depth localization unit 122 specifies the position of the object in the depth direction by detecting the differences in frames in the reflection surface area (S14). The action specifying unit 132 determines whether the object 70 has entered the first access area 62 in accordance with the information from the depth localization unit 122 (S16). As long as the object 70 stays outside of the first access area 62 (N in S16), the application is not executed.

When the object 70 enters the first access area 62 (Y in S16), the action specifying unit 132 instructs the application execution unit to start the application. Also, the in-frame localization unit 114 specifies the position of the object in the frame by matching, and the display control unit 134 displays a predetermined application image while superimposing the image at the position of the object in the frame (S18). As long as the object 70 stays in the first access area 62, the in-frame localization unit 114 continues to track the object (S20). The depth localization unit 122 specifies the position of the object in the depth direction by detecting the differences in frames in the reflection surface areas corresponding to the first reflection surface 52 and the second reflection surface 54 (S22).

The action specifying unit 132 determines whether the object 70 has entered the second access area 64 in accordance with the information from the depth localization unit 122 (S24). As long as the object 70 stays outside of the second access area (N in S24), the processes in S18-S12 are repeated. When the object 70 enters the second access area 64 (Y in S24), the action specifying unit 132 determines that a key in the application image 80 is pushed and notifies both the application execution unit and the display control unit 134 of the information. In response, the process, in accordance with the position of the object 70 in the frame, is performed, and the display mode of the application image 80 is changed (S26).

As described above, in the embodiment, the action of the object is detected in the depth direction, which is caused by the player, such as pushing and pulling, by detecting the entry of the object in the predetermined access area by using the reflected image output by the reflector. In the conventional detection of an object based on the differences in frames, it is extremely difficult to detect the displacement of the object in the depth direction, that is, the displacement along the optical axis of a camera. However, in the embodiment, a reflected image from the direction perpendicular to the optical axis of a camera is used so that the displacement of an object in the depth direction can be detected accurately.

Conventionally, when some features are provided, including displaying a character and such and outputting a sound in the frame in which the object is present, the display of the character and the output of the sound continue while a player moves the object. Unless other input devices are used, it is difficult for the player to intentionally turn off these displays and sounds. Contrarily, in the embodiment, turning on and off certain features of the application and switching features such as displaying and hiding images can be easily realized just with the manipulation of the object by moving the object 70 between the first access area 62 and the second access area 64.

As described by referring to FIG. 5 through FIG. 8, the action by the player can have multiple meanings in the embodiment. More specifically, while the object 70 stays in the first access area 62, the manipulation of the object 70 by the player 72 corresponds to the "select" manipulation in the application image 80. Thus, by moving the object, the key that can be selected is changed in the application image 80. When the player 72 manipulates the object 70 so that the object 70 is further pushed while a desired key is being selected, the object 70 enters the second access area 64, and, as a result, the manipulation indicating "OK" is performed. As described above, one of the features in the embodiment is the point that the stroke of the object can be detected.

Various kinds of applications can become possible with the use of the stroke. For example, if pushing a hand toward a camera corresponds to a catching movement and pulling the hand away from the camera corresponds to a releasing movement, a game can be realized in which a character appearing on the screen can be caught or released using a hand.

Also, pushing a hand toward a camera may correspond to turning a specific feature on, and pulling a hand may correspond to turning a specific feature off. This can be applied, for example, in paint software, to change the shape of a cursor displayed on a screen by pushing a hand, to draw a line on the screen by moving the hand while the hand is being pushed, to change the cursor to its original shape and to stop drawing a line, even with the hand movement by a pulling of the hand. In the similar conventional application, once an object is detected, the movement of a hand always results in drawing a line. Contrarily, according to the embodiment, a player can easily turn features on and off through the simple action.

In the embodiment 1, it is described that the reflector 50 is provided with two reflection surfaces 52 and 54. However, the number of the reflection surface is not limited to two. When there is one reflection surface, the action on an object cause by a player such as pushing and pulling the object cannot be identified; however, it can be determined at least whether the object is located in the access area corresponding to the reflection surface. Even when there are at least three reflection surfaces, the same applies in the point that access area corresponding to each reflection surface is set, and the depth localization unit 122 determines with respect to each access area whether an object has entered. Increasing the number of the reflection surfaces permits more complicated action by a player to be identified. Thus, a wider variety of instructions can be given to the application.

Embodiment 2

In the embodiment 1, the case is described where an application image of a calculator is displayed as being superimposed at the position of an object in a frame. In the embodiment 2, the case is explained where a character that can be manipulated by a player is displayed.

Figure 10B:
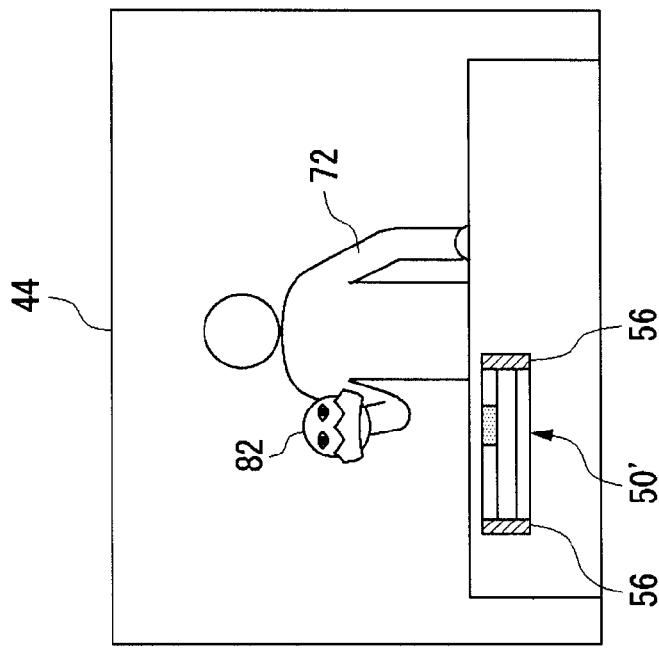
FIG. 10B is a diagram showing a character image displayed at the position of a hand as the object.
Figure 10A:
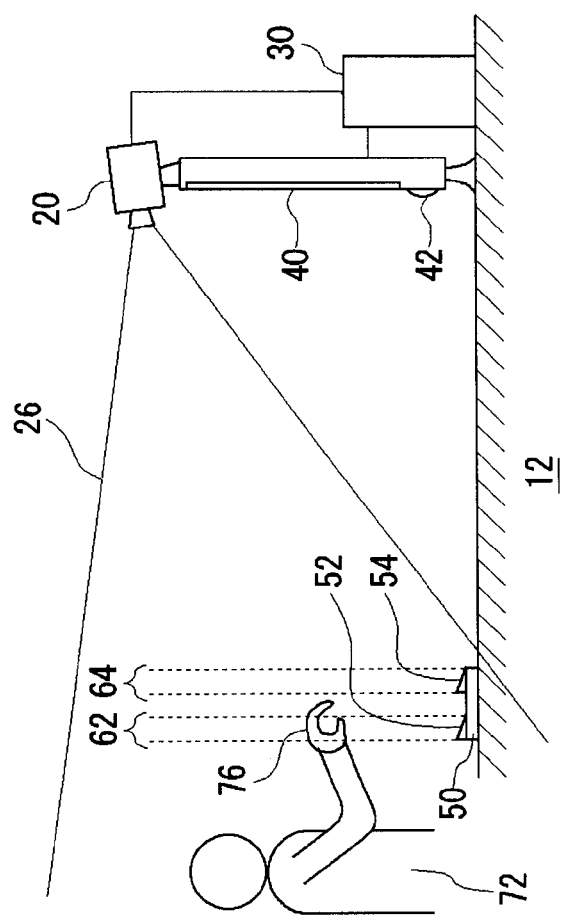
FIG. 10A is a diagram showing the positional relation between an object and an access area.

FIG. 10A shows the whole configuration of a three-dimensional position-specifying device 12 according to the embodiment 2. The positions of the camera 20, the image processing device 30, the display 40, and the reflector 50 are same as in the embodiment 1. In FIG. 10A, the object 76 that a player manipulates is the player's whole hand. When the object enters the first access area 62, the process in each functional block is performed as described above, and the action specifying unit 132 identifies the action of the player.

In the embodiment 2, using a reference image showing the state with a hand open and a reference image showing the state with a hand closed as reference images for matching with the object 76, the object detection unit 116 performs matching with either of the reference images. With this, the object detection unit 116 can detect not only the position of the object in the frame but also whether the hand is open or closed. The action specifying unit 132 instructs the display control unit 134 to display at the position of the object in the frame an image of a character with its mouth open when the hand is open and an image of a character with its mouth closed when the hand is closed.

FIG. 10B shows a screen 44 in which a character image 82 corresponding to the state of FIG. 10A is displayed. In FIG. 10A, since the hand that is the object 76 is closed, the character image 82 with the character's mouth closed is superimposed on the object 76 and displayed.

Figure 11B:
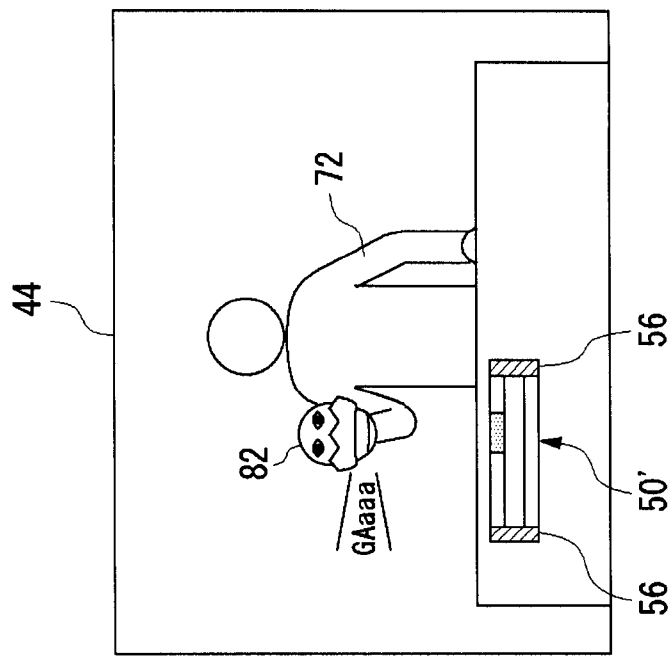
FIG. 11B is a diagram showing a character image displayed at the position of a hand that is the object.
Figure 11A:
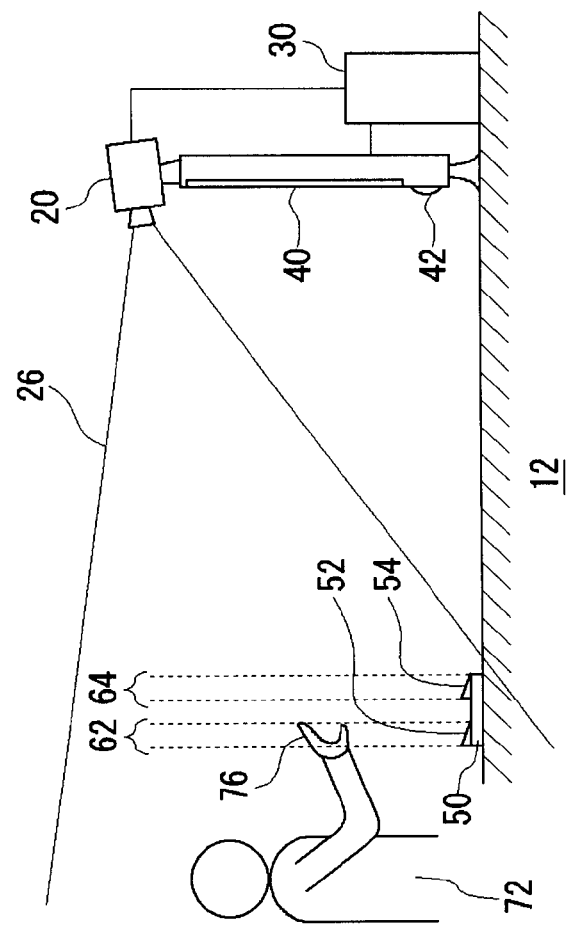
FIG. 11A is a diagram showing the positional relation between an object and an access area.

As shown in FIG. 11A, when the player 72 opens his/her hand, that is, the object 76, in the first access area 62, the object detection unit 116 detects the state in which the hand is open. In response, as shown in FIG. 11B, the character image 82 with the character's mouth open is superimposed on the object 76 and displayed.

The action specifying unit 132 may output a sound to a sound output unit 36 in accordance with the change of the character's mouth. For example, a sound may not be produced when the character's mouth is closed but may be produced when the character's mouth opens. With this, an application can be realized in which a character speaks by the player opening and closing the hand in the first access area 62.

The object detection unit 116 has the reference images of the hand at multiple stages of opening the hand, and the degree of opening the hand may be detected by matching using the images. In this case, the action specifying unit 132 may instruct the display control unit 134 to change the degree of opening of the character's mouth in accordance with the degree of opening the hand. Also, the action specifying unit 132 may instruct the sound output unit 36 to change the volume of the sound, the pitch of the sound, and the tone of the sound in accordance with the degree of opening the character's mouth. In this case, a plurality of sound data items are saved in a non-illustrated sound data storing unit, and the sound output unit 36 searches and outputs the appropriate sound data in response to the instruction from the action specifying unit 132.

In the embodiment 2, the first access area 62 and the second access area 64 may also be used to turn on and off certain features. As an example, the display of the character image 82 may start when the object 76 enters the first access area 62, and the sound may be produced in accordance with the opening and closing of the hand only when the object 76 is in the second access area 64. If the player 72 opens and closes his/her hand acting as the object 76 while the object 76 is in the first access area 62, the character's mouth of the character image 82 in the screen picture moves in synchronization with the hand movement, but no sound is produced.

Figure 12B:
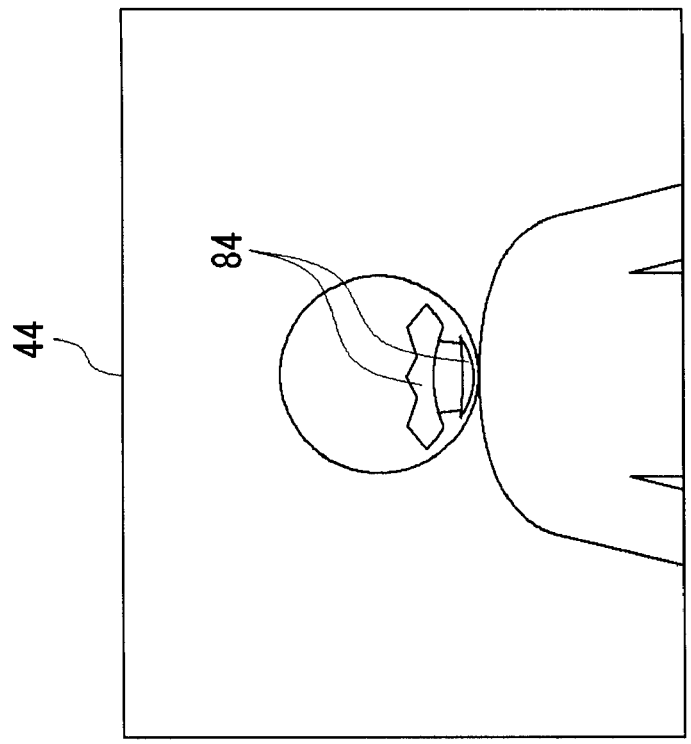
FIGS. 12A and 12B are diagrams showing an application for displaying a character image at the position of a mouth as the object.
Figure 12A:
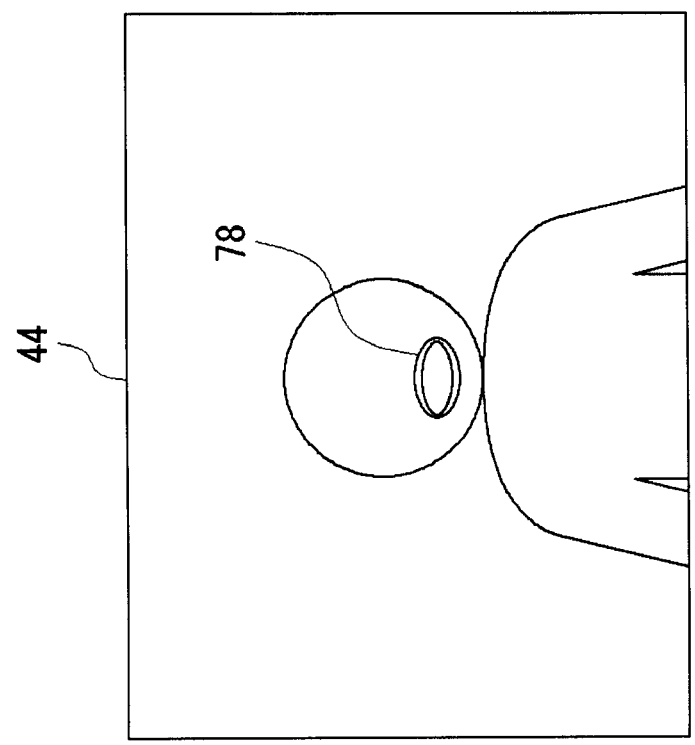

The object on which the character image is superimposed may be other part of the body of the player 72, for example, a mouth. FIGS. 12A and 12B show the case where a mouth is used. In the frame captured by the camera 20, the object detection unit 116 detects player's lips 78 by the matching and specifies the position of the lips in the frame. The object detection unit 116 detects the degree of opening the mouth by performing matching using a plurality of reference images. The display control unit 134 displays the character image 84 having the shape of the upper and lower lip being superimposed on the player's lips. The display control unit 134 changes the gap between the upper and lower lip of the character image 84 in accordance with the degree of the mouth opening.

The action specifying unit 132 instructs the sound output unit 36 to produce a sound in synchronization with the opening and closing the mouth. Using this, an application can be realized in which a sound different from the player's voice, for example, an animal call or the voice of a famous person, are output in synchronization with the movement of the player's mouth.

The application may be achieved in which an image of another character is displayed in the place where it is not overlapped with a mirror image of a player, and the player moves his/her mouth mimicking the movement of the character's mouth. The character's voice may be output when the player can move his/her mouth in synchronization with the movement of the character's mouth.

In the example of FIG. 12, once the player's mouth is detected by the object detection unit 116, a sound is output every time the player moves his/her mouth. Applying the depth localization with the reflector 50, a sound may be output only when the object such as the player's hand or finger, is in the first access area 62 or in the second access area 64. As described above, the display of the character image superimposed on the player's mouth may start when the object enters the first access area 62, and the sound may be produced in accordance with the movement of the player's mouth when the object enters the second access area 64. Thus, in the invention, since the position in a depth direction is not specified by matching but by taking the differences in the reflection surface area in frames, the object used for the depth localization may be different from the object used for the specification of the position in a frame by matching. Thus, the depth localization using the reflector can be used only as a switch for turning on/off specific features using the matching of the object.

Embodiment 3

In the embodiments 1 and 2, the technique is explained for specifying the three-dimensional position of an object using the reflector 50, with two reflection surfaces positioned apart from one another in the depth direction. In the embodiments 1 and 2, matching is performed using reference images in order to specify the position of an object in a frame. For this reason, it is necessary to store the reference image of the object in the reference image memory unit 120 in advance. The reference image may be stored in advance; however, when a part of the player's body is used as an object, the reference image of the object for every player is desirably taken in order to improve the recognition accuracy.

Thus, in the conventional art, a predetermined screen picture is displayed before the execution of an application, and a player is prompted to conduct the manipulation to have the image of the object captured by a camera so that the reference image of the object can be obtained. However, a problem with this is not only that the player is requested for an unnecessary movement but also that the application, such as a game, cannot be executed promptly.

Thus, in the embodiment 3, the technique will be explained in which the reference image of the object is acquired using the same configuration as in the three-dimensional localization of the object without retaining the reference image of the object in advance. With this, the player can execute the application right after the installation of the camera, the display, and the reflector. The difference lies in that, instead of the reflector provided with two reflection surfaces positioned apart from one another in the depth direction used in the embodiments 1 and 2, a reflector provided with a first reflection surface and a second reflection surface that are angled so that normal lines to each surface cross with each other on the side where the object is located and that can reflect the object at the same time in the embodiment 3 is used.

Figure 13:
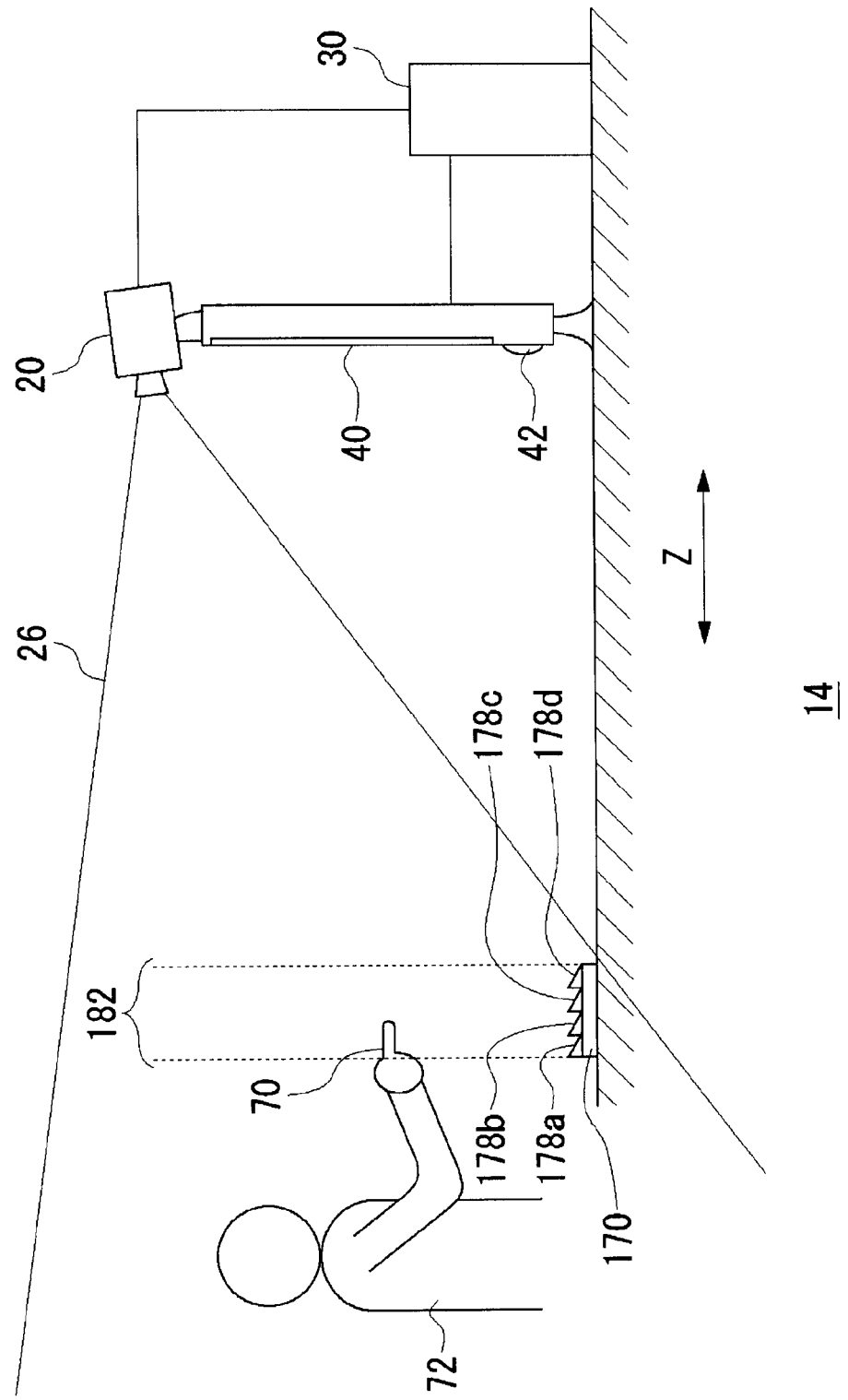
FIG. 13 is a diagram showing the configuration of a three-dimensional position-specifying device according to the embodiment 3.
Figure 14:
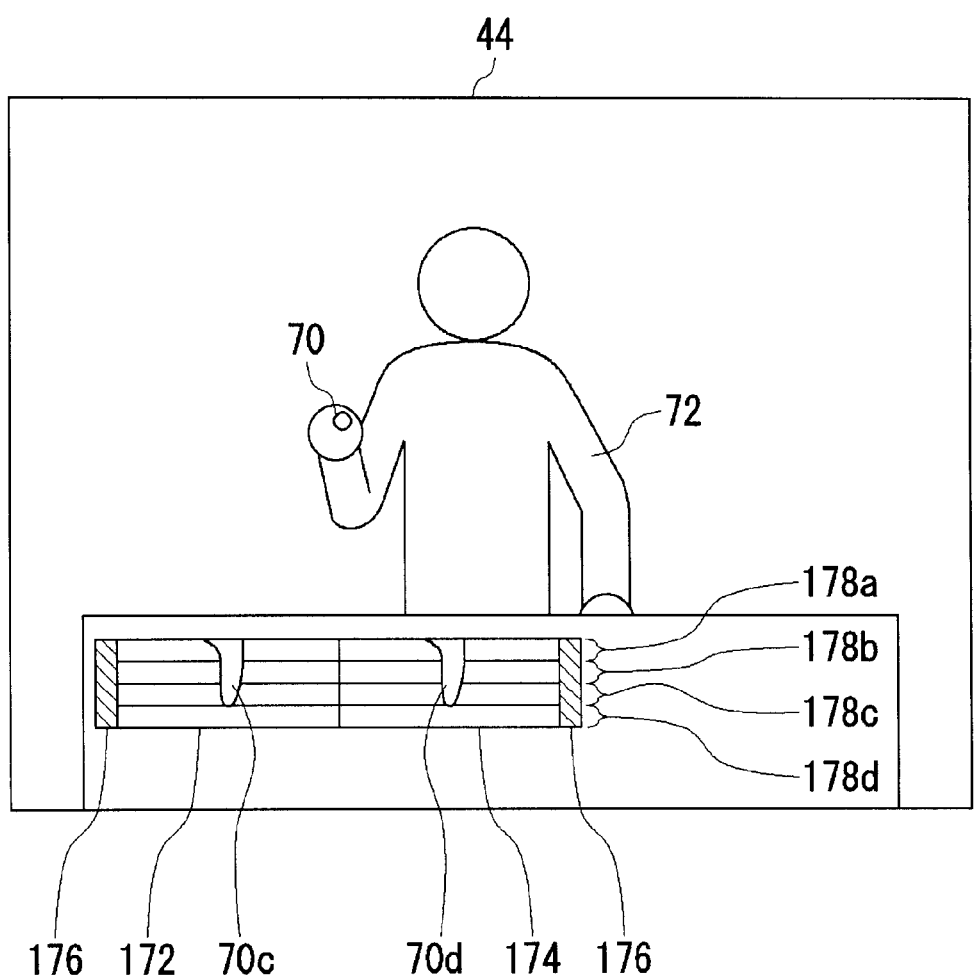
FIG. 14 is a diagram showing the screen picture to be recognized by a player on a display in the state shown in FIG. 13.
Figure 15:
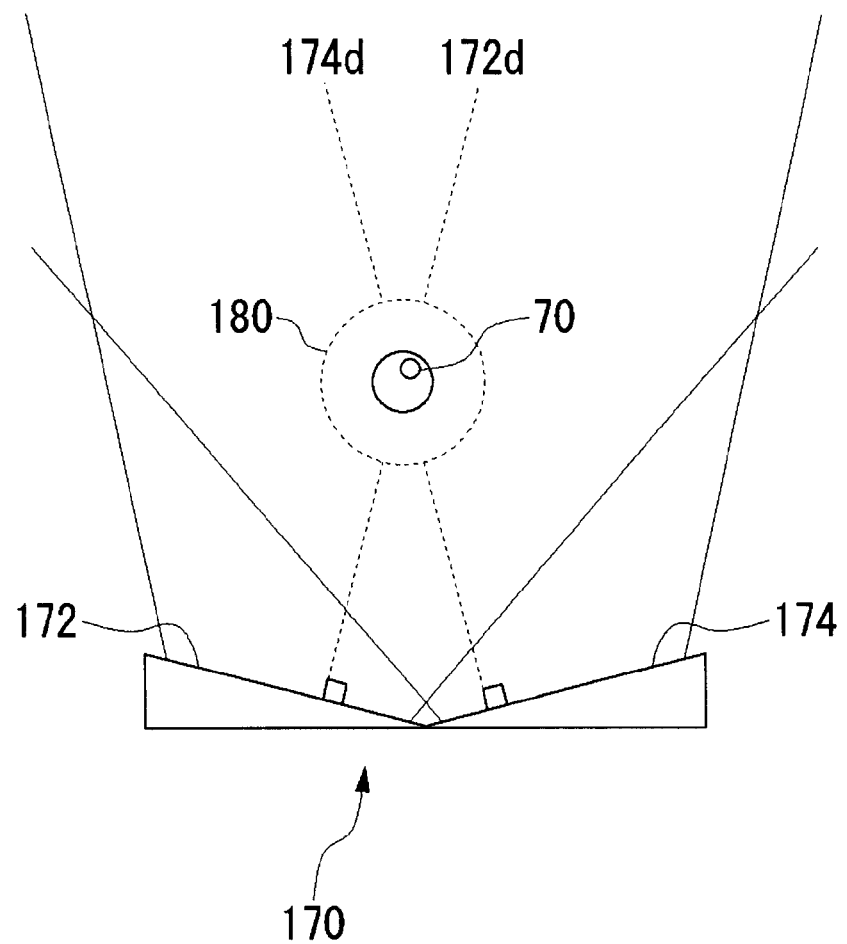
FIG. 15 is a sectional view perpendicular to the depth direction of a reflector.

FIG. 13 shows a three-dimensional position-specifying device 14 according to the embodiment 3. FIG. 14 shows a screen 44, displayed on a display 40, to be recognized by a player in a state shown in FIG. 13. FIG. 15 is a sectional view perpendicular to the depth direction, that is, the z-direction of a reflector 170.

In FIG. 13, the basic features and positions of the camera 20, the image processing device 30, and the display 40 are same as those explained in FIG. 1. In the three-dimensional position-specifying device 14, the configuration of the reflector 170 is different from that in the embodiment 1. The reflector 170 has a first reflection surface 172 and a second reflection surface 174. As shown in FIG. 15, the first reflection surface 172 and the second reflection surface 174 are angled so that normal lines to each surface 172d and 174d cross with each other on the side where the object is located and are positioned so that two reflected images of the object can be reflected toward the camera 20 at the same time.

As shown in FIG. 14, the first reflection surface 172 and the second reflection surface 174 are provided with a plurality of strip-shaped reflection surfaces 178a-178d lined up in the depth direction. In FIG. 14, one reflection surface is provided with four strip-shaped reflection surfaces. A marker 176 for the recognition is placed on each end of the longer axis of the reflector 176 as on that of the reflector 50.

The first reflection surface 172 and the second reflection surface 174 may be composed of a mirror, a mirror-finished metal, a plastic, or a glass onto which a metal is evaporated as those of the reflector 50; however, they are preferably of a planar micro prism mirror composed by arranging minute prisms in a plane. Composing the reflection surface with a micro prism mirror prevents the thickening of the reflector 170; thus, the installation of the reflector is easy and requires only a small space. In FIG. 13 and FIG. 15, for the purpose of showing the direction of the reflection, the first reflection surface 172, the second reflection surface 174, and the strip-shaped surfaces 178a-178d are shown with angles. However, it is to be understood that the micro prism mirror, even almost in a plane, can actually have such a reflection angle.

Since the first reflection surface 172 and the second reflection surface 174 are positioned at angles, as shown in FIG. 14, two reflected images 70c and 70d of the object appear in the frame output by the camera 20, which are reflected respectively by the first reflection surface 172 and the second reflection surface 174. In other words, it is as if the image of the object 70 is stereo-captured by multiple cameras. Thus, using a well-known stereo photography, the three-dimensional position of the object 70 can be specified from the two reflected images 70c and 70d.

Figure 16:
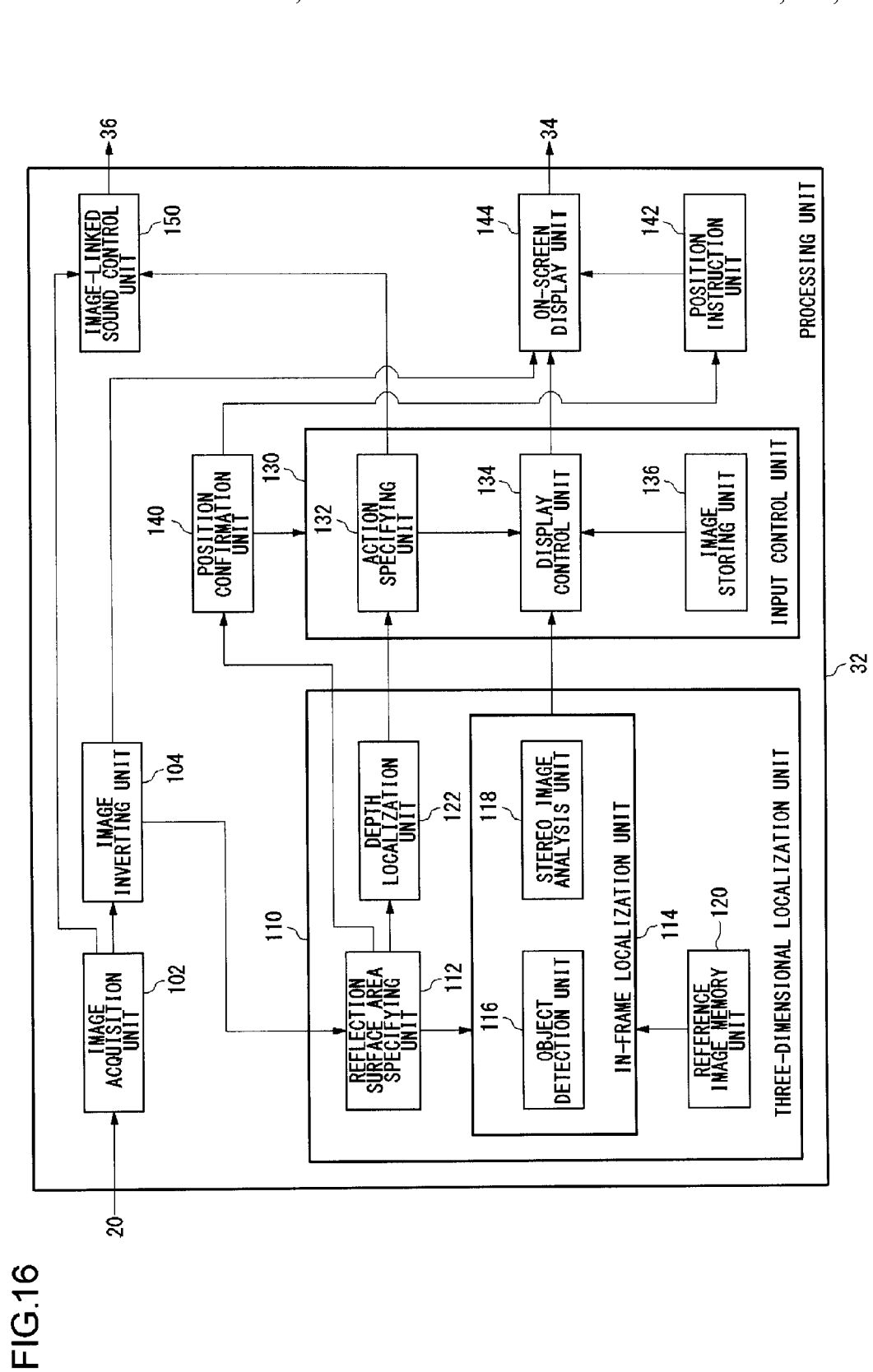
FIG. 16 is a diagram showing the configuration of an image processing device according to the embodiment 3.

FIG. 16 shows the configuration of image processing device 30 in the embodiment 2. The functions of the image acquisition unit 102, image inverting unit 104, position confirmation unit 140, position instruction unit 142, and on-screen display unit 144 are same as shown in FIG. 4; thus the further description thereof is omitted.

The reflection surface area specifying unit 112 specifies the reflection surface area based on the position of the markers 176 in the frame received from the image inverting unit 104.

The in-frame localization unit 114 includes a stereo image analysis unit 118 in addition to the object detection unit 116. The stereo image analysis unit 118 specifies the position of the object 70 in the frame in accordance with the known technique, using the two reflected images 70c and 70d specified in the reflection surface area by the reflection surface area-specifying unit 112. The position of the object 70 in the frame can be roughly determined from the positions where the reflected images 70c and 70d are reflected and from the differences in size between the reflected images 70c and 70d.

The reference image memory unit 120 clips an image in a predetermined range having the position of the object 70, specified by the stereo image analysis unit 118, in the frame at the center and stores the clipped image as a reference image. As shown in FIG. 15, the object 70 is assumed to be located around where normal lines to the first reflection surface 172 and the second reflection surface, which are extended from where the two reflected images are located, crosses with each other. Thus, the reference image of the object can be obtained by clipping the area in the frame which corresponds to the circle 180 in FIG. 15.

The accuracy of the position of the object in the frame determined by the stereo image of the reflected image is not very high; however, clipping the image in the range larger than the targeted object can cover the poor accuracy of the position. The proper value may be determined for the size of the region to be clipped through experiments. The stereo image analysis unit 118 stores the image in the predetermined region in the reference image memory unit 120 as a reference image.

After a series of processes is finished, the object detection unit 116 can perform in-frame localization and tracking of the object 70 by referring to the reference image in the reference image memory unit 120.

Detecting which reflection surface of the plurality of strip-shaped reflection surfaces 178a-178d the reflection images 70c and 70d of the object 70 is reflected in based on the differences in the frames, the depth localization unit 122 can specify the position of the object 70 in the depth direction.

Figure 17:
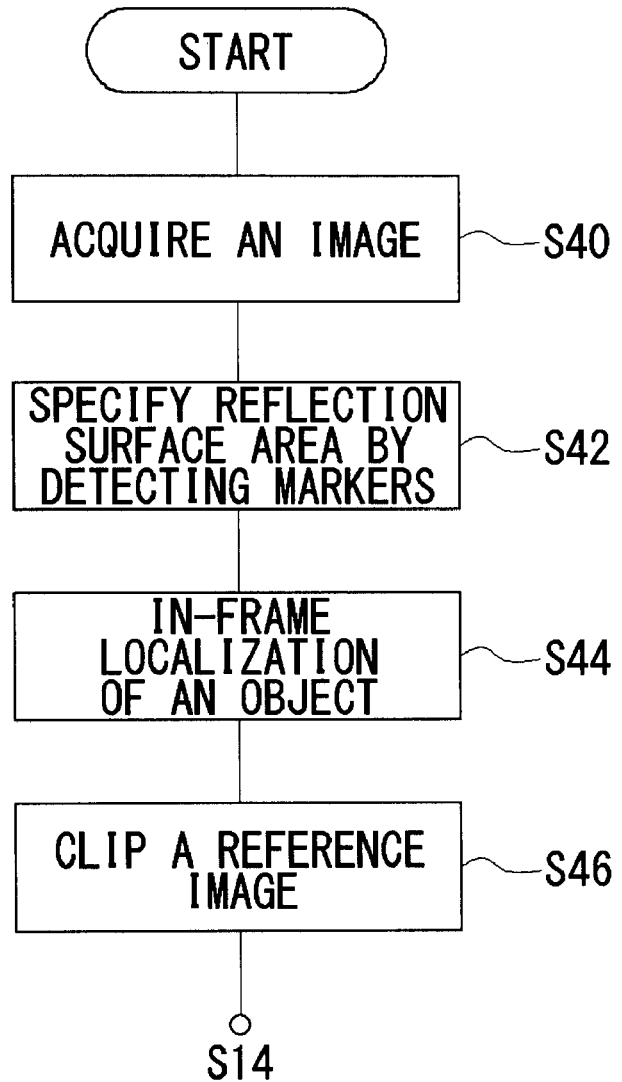
FIG. 17 is a flowchart showing the sequence for executing a calculator application similar to the applications shown in FIG. 5 through FIG. 8 in the embodiment 3.

FIG. 17 is a flowchart showing the sequence for executing a calculator application similar to the applications shown in FIGS. 5-8 in the embodiment 3.

After the reflector 170 is placed at the right position, the images of the object 70 and reflector 170 are captured by the camera 20, and the image acquisition unit 102 acquires the frame including the direct image and reflected image of the object 70 (S40). The reflection surface area-specifying unit 112, by detecting the markers 176 in the frame provided by the image inverting unit 104, specifies the reflection surface area (S42). The reflection surface area-specifying unit 112 may obtain an image of the reflection surface area as a default image for the detection of the differences from the reflection image of the object 70 before the object 70 enters the access area 182. The depth localization unit 122 detects the entry of the object in the access area 182 by detecting the differences in frames in the reflection surface area. In response, the stereo image analysis unit 118 specifies the rough position of the object 70 in the in-frame on the two reflected images 70c and 70d of the object reflected in the reflection surface area specified by the reflection surface area specifying unit 112 (S44). The stereo image analysis unit 118 clips from the frame the image within the predetermined range 180 having the specified position in the frame at the center as the reference image for matching and stores the clipped image in the reference image memory unit 120 (S46). What follows subsequently is same as in S14 and after. The in-frame localization unit 114 specifies the position of the object in the frame by using the reference image stored in the reference image memory unit 120, and the depth localization unit 122 specifies the position of the object in the depth direction by detecting the differences in the frames in the reflection surface area.

The position of the object in the frame not specified correctly by the stereo image analysis unit 118 results in a failure in clipping the reference image, and the object cannot be detected by matching by the object detection unit 116. In this case, the player may be notified to clip the object again.

As described above, according to the embodiment 3, by using the reflector provided with the first reflection surface and the second reflection surface, which are angled so that the normal lines to each surface cross with each other on the side where the object is located, the stereo image of the reflected image of the object is obtained. Detecting the differences in the reflection surface area between the default image of the background and the image captured when the object entered the area allows one to time when the stereo image of the object should be acquired for clipping the reference image. The robustness for the detection of the differences is improved by having the default image stored. Since the rough position of the object in the frame can be specified by the analysis of the stereo image without performing matching of the object, the image within the predetermined range in the frame having the specified position at the center can be clipped as the reference image.

As described above, since the movement of the player to store the reference image is omitted at the stage of clipping the reference image, it attributes to the prompt start of the application. In other words, the player is not forced to perform any specific movements, and the steps taken to obtain the reference image cannot be seen by the player. Following the clipping of the reference image, the position of the object in the frame is detected with a high degree of accuracy by matching. Thus, one of the features in the embodiment 3 is to be able to achieve a balance between the prompt start of the application and the high accuracy of the position detected by matching.

Using the above mentioned reflector 170, the three-dimensional position of the object can be specified only with the reflected image even without the direct image of the object in the frame captured by the camera. However, in the embodiment 3, in order to improve the accuracy of the in-frame localization, the position of the object in the frame is specified by matching by using the reference image upon the successful clipping of the reference image.

More complicated applications can be achieved by improving the detection accuracy of the movement of the object in the depth direction by increasing the number of the strip-shaped reflection surfaces of the reflector 170. One of the possible examples is a virtual surgical operation. Having a three-dimensional image of a site to be operated displayed on a three-dimensional liquid crystal display, the player holds and manipulates a bar-shaped object instead of a surgical instrument such as a surgical knife. The three-dimensional position of the object is specified by the three-dimensional localization unit 110 and the three-dimensional image of the site to be operated that is displayed on the three-dimensional liquid crystal display is changed in accordance with the position. As an example, an image is displayed showing the site to be operated is cut open as the object is moved to a given direction. While a LED is mounted on multiple sites of the object, the trajectory of the LED when the object is moved may be detected in frames, and a motion vector of the object may be determined. With this, using the embodiment 4 that will be described hereinafter, predetermined sound effects can be output from a speaker in synchronization with the movement of the object.

Using a micro prism mirror as a reflection surface permits the control of the curvature of the concave-convex surface of the mirror so that a field angle can be adjusted. Thus, the access area for determining the entry of the object is not limited to vertically upward direction of the reflection surface as shown in FIG. 13, but the area can be spread out in a fan-like form or can be narrowed. As the access area becomes larger, the accuracy of the position becomes lowered. However, the region where the movement of the object in the depth direction can be detected can be larger.

Embodiment 4

The embodiments 1 through 3 describes that the three-dimensional position of the object manipulated by the player is specified by using the reflector, and the action is specified by this so as to operate the application. In all cases, changing a display mode of an application image displayed on a screen permits a player to be notified of the state of a specific function whether the function becomes active or inactive due to the recognition of an action.

In addition to the visual notification by the change in a display mode of an application image on a display, the output of a sound through a speaker in accordance with an action will be advantageous since a player can be notified aurally. In this case, if the sounds are output after the recognition of the image of an object, the time at which the player recognizes visually and the time at which the player hears the sound may be asynchronous and the player may feel discord. Thus, in the embodiment 4, a technique is explained in which a velocity vector of the object is detected by image processing, an expected travel time for the object to reach a virtual or real contact surface is calculated, and the sounds are output before the object reaches the contact surface.

Figure 18:
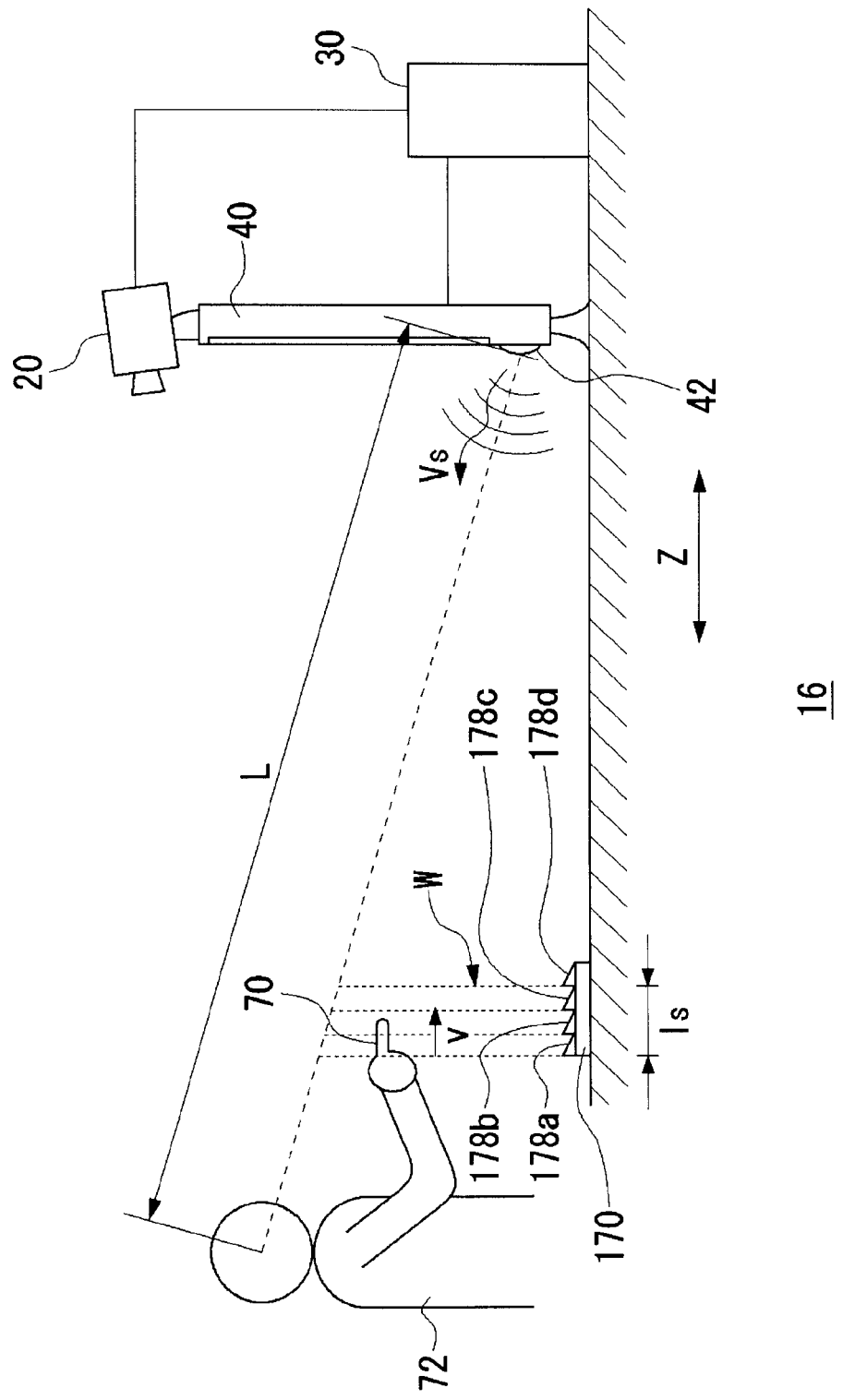
FIG. 18 is a diagram showing the configuration of a three-dimensional position-specifying device according to the embodiment 4.

FIG. 18 shows a three-dimensional position-specifying device 16 according to the embodiment 4. In FIG. 18, the camera 20, the image processing device 30, and the display 40 are as shown in FIG. 13. The calculator application explained by referring to FIG. 5 through FIG. 8 is now taken into consideration.

A player 72 manipulates the object 70. The depth localization unit 122 detects the entry of the object 70 in the access area corresponding to the strip-shaped reflection surface 178d, and the action specifying unit 132 specifies the movement of the object 70 in the direction toward the camera and notifies the application execution unit and the display control unit 134 of the entry and the movement of the object. With this, as described above, the display mode of the selected area of the application image is changed, and the number corresponding to the selected area is entered in the calculator application.

In the embodiment 4, along with the change in the display mode of the application image, a predetermined sound is output from a speaker 42. Hearing the sound along with the change in the display mode of the application image, the player 72 can have a stronger feeling of manipulating the application through the object. Also, the player 72 can be aware that there is a virtual contact surface (assumable contact surface) W at the place corresponding to the strip-shaped reflection surface 178d as shown in FIG. 18.

Figure 19:
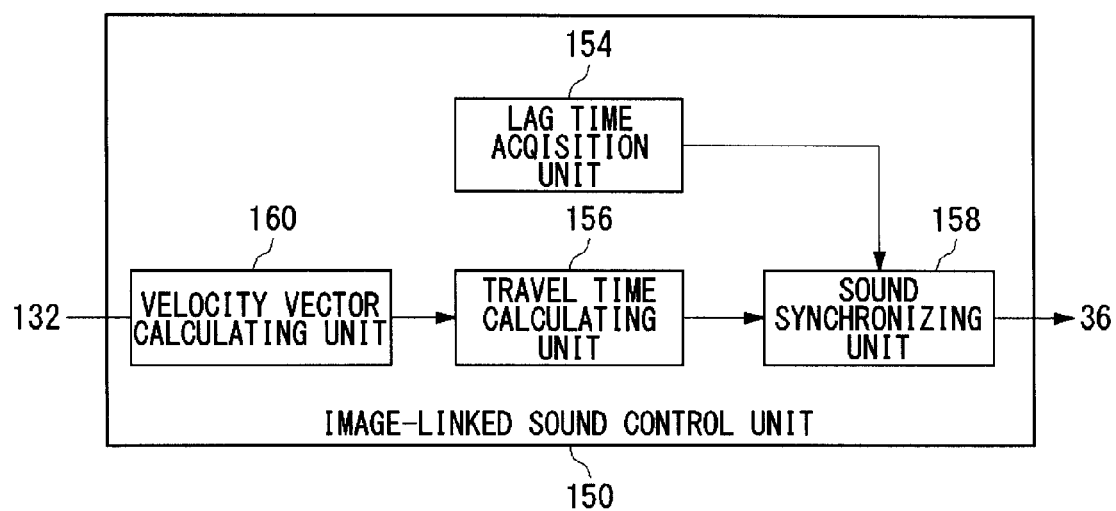
FIG. 19 is a diagram showing the configuration of an image-linked sound control unit in the image processing device according to the embodiment 4.

FIG. 19 shows the configuration of an image-linked sound control unit 150 in the image processing device 30 according to the embodiment 4. It will be obvious to those skilled in the art that the functional blocks may be implemented by hardware, software, firmware, or a combination of these. A detailed description will be made hereinafter mainly regarding each functional block by referring to FIG. 18.

A velocity vector-calculating unit 160 calculates a velocity vector of the movement of the object 70 moving toward the assumable contact surface W manipulated by the player 72 by using the frame captured by the camera 20. Specifically, the velocity vector of the object is calculated based on the differences in the reflected images in a plurality of frames. A time difference tf is calculated by referring to a frame rate of the camera 20 between the following frames: the frame in which the entry of the object 70 in the access area corresponding to the strip-shaped reflection surface 178a is determined by the depth localization unit 122, and the frame in which the entry of the object in the access area corresponding to the strip-shaped reflection surface 178b or 178c is determined. Also, having the distance between the strip-shaped reflection surface 178a and the strip-shaped reflection surface 178b or 178c determined to be ls, the velocity vector calculating unit 160 calculates the velocity v of the object 70 in the depth direction (that is, the z-direction) is calculated by the equation $v=ls/tf$.

A travel time calculating unit 156 calculates the travel time $tm=li/v$ of the object 70 to reach the assumable contact surface W by using the velocity v and the distance li between the object and the assumable contact surface W.

The lag time acquisition unit 154 acquires the lag time td that the sound output from a speaker 42, which is positioned apart from the player, takes to reach the player 72. In reality, the accurate distance L from the speaker 42 to the player 72 is unknown since the distance varies depending on the player. However, since the position at which the reflector 170 is to be placed is determined, the distance L is practically constant. Since the acoustic velocity Vs is constant, the lag time td is a given constant. In this case, the lag time acquisition unit 154 may use constant td. In another embodiment, the distance L from the speaker 42 to the player 72 may be input by the player. In this case, the lag time acquisition unit 154 calculates the lag time td using $td=L/Vs$.

The sound synchronizing unit 158 outputs from the speaker 42 the sound synchronized with the player's action by referring to the travel time tm and the lag time td. More specifically, the sound synchronizing unit 158 outputs a predetermined sound after the time is passed, which is obtained by using the time at which the frame used for calculating the velocity v is captured as a starting point and withdrawing the lag time td from the travel time tm. This allows the player to hear the sound output from the speaker 42 substantially at the same time as the object reaches the assumable contact surface W.

In the above example, the sound is output in synchronization with the change of the display mode of the application image displayed on the display. It is also possible for the player to recognize the presence of the virtual contact surface only with the sound output, without using any application images.

If what is conceived as the assumable contact surface is a real surface, the output sound may be different from the sound that is actually produced when the object touches the surface.

As described above, before the object reaches the virtual or real contact surface, the time the object takes to reach the contact surface is calculated, and the sound is output in consideration of the sound lag according to the embodiment 4. With this, the player can be notified both visually and aurally that his/her action is recognized.

Since the sound lag in the distance between the speaker and the player is not practically considered to be a problem, the lag time td obtained from the lag time acquisition unit 154 may not be considered by the sound synchronizing unit 158, especially when the moving speed of the object is comparatively slow. In this case, the sound synchronizing unit 158 outputs, when any action of the player (e.g., action of selecting) is identified by the action specifying unit 132, a corresponding clicking sound or sound effect from the speaker 42. Also, in order to improve the gameplay, the sound synchronizing unit 158 may output a sound at a point in time earlier than that of the measured travel time.

As described above, by outputting the sound accompanying the detection of the player's action, the sensation of the player is improved. In other words, by outputting the appropriate sound effect accompanying the entry and exit of the object with respect to the given access area, the entry of the object in the access area is detected, and the player can realize that what the area suggests is different from what the other area does. Also, during trial and error in manipulating the application by the player using the object, outputting the sound when the object is in an appropriate area allows the player to learn the manipulation method.

In the application shown in FIG. 12, the velocity of opening and closing the mouth may be calculated by the velocity vector calculating unit 160 by using the information on the differences of the mouth opening in a plurality of frames. The sound synchronizing unit 158 may adjust the timing to output the sounds by using the velocity of the opening and closing the mouth and the lag time so that the opening and closing of the mouth and the sound output from the speaker are synchronized.

Embodiment 5

In the embodiment 4, the calculation of the velocity vector in the depth direction of the object that is manipulated by the player by using the width of the reflector in depth direction is described. In the embodiment 5, a detailed description will be made mainly regarding a technique, without using a reflector, to estimate the velocity vector of an object using only the frames captured by a camera. However, in the embodiment, not a moving component of the object in depth direction but a moving component in a frame is to be detected.

Figure 20:
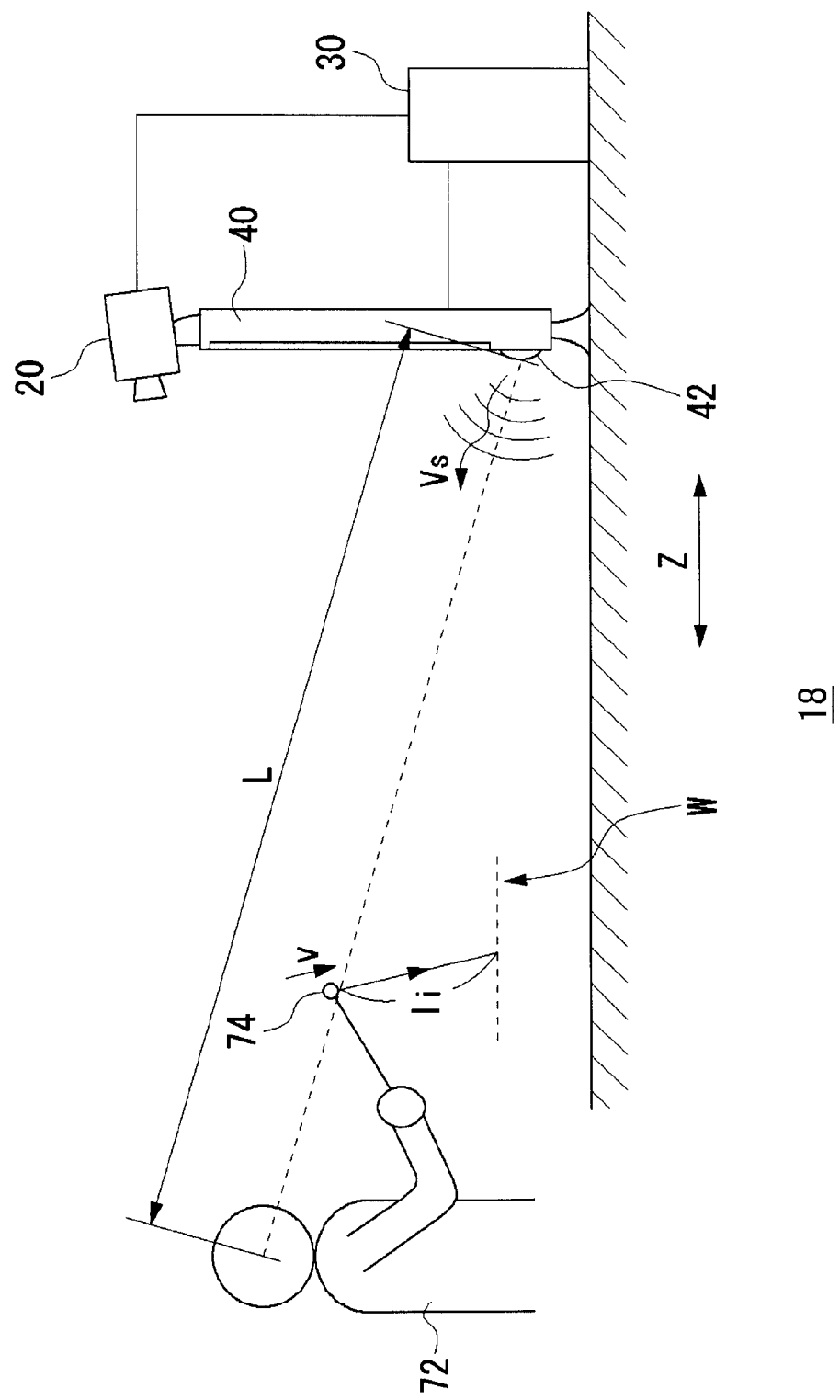
FIG. 20 is a diagram showing the configuration of a three-dimensional position-specifying device according to the embodiment 5.

FIG. 20 shows the configuration of a three-dimensional position-specifying device 18 according to the embodiment 5. The positions of the camera 20, the image processing device 30, and the display 40 are the same as described in the above-mentioned embodiments. In the embodiment 5, a reflector is not used. Instead, an object 74 equipped with a light emitting device such as LED is used.

Figure 21:
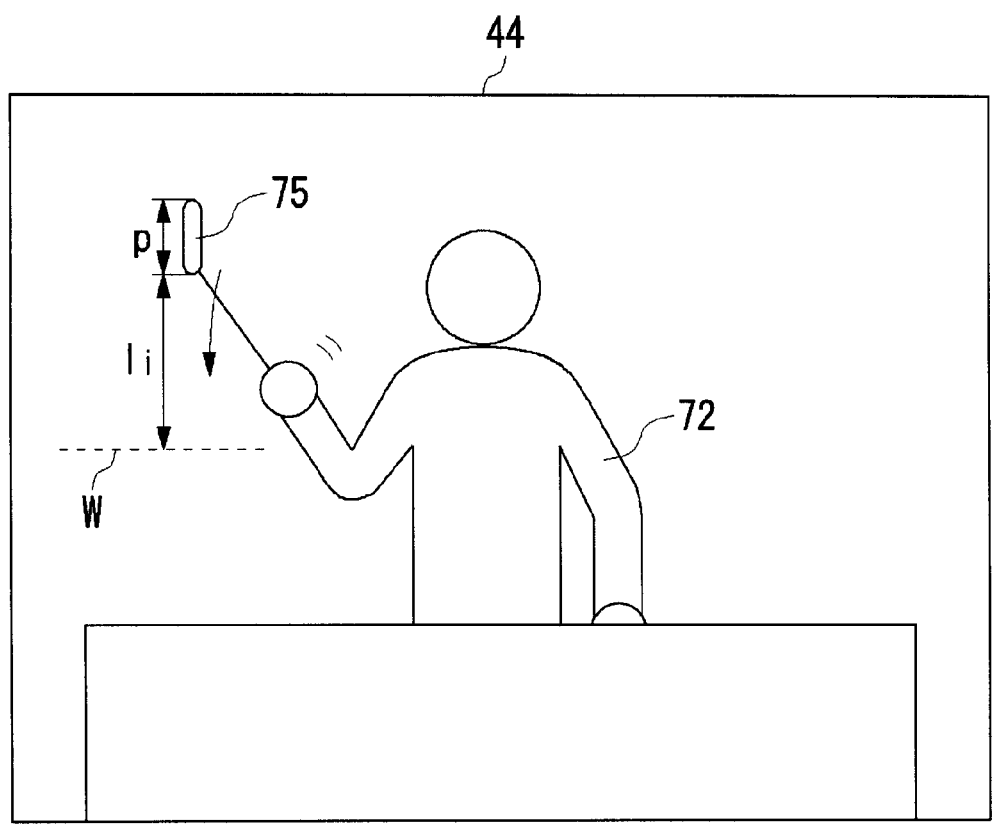
FIG. 21 is a diagram illustrating the principle of a method of calculating a velocity vector of an object based on a frame captured by a camera.

FIG. 21 is a diagram illustrating the principle of a method of calculating a velocity vector of an object from a frame captured by the camera 20. An image sensor such as CCD and CMOS outputs a signal in accordance with the amount of light stored in elements, and a predetermined amount of time is required for scanning the whole elements. More specifically, with respect to each pixel of the image sensor, the light is captured line by line starting from a top line of the elements to a bottom line, and the amount of light captured is then read out. As in capturing the light, the amount of light is read out line by line starting from the top line of the elements and line by line to the bottom line. Thus, the information including time differences between the line of the elements about to capture the light and the line of the elements about to be read out is included in one frame.

For example, in a CMOS sensor, the difference in starting time of the light capturing in each line causes the distortion of an image in the top part of the image read out earlier and in the bottom part of the image read out at last when an object moves fast (image distortion of a moving object). Since the amount of light is read out line by line in CMOS, if one screen picture is read in $1/15$ second, the time difference between the start of reading and the end of reading is $1/15$ second.

Thus, when an object that emits light is moved at high speed, the passage of the light in a frame can be seen as a trajectory 75 as shown in FIG. 21. Therefore, if the time required for scanning from the first element to the last element from the image sensor is to be found, the velocity of the object that created this trajectory can be calculated.

Figure 22:
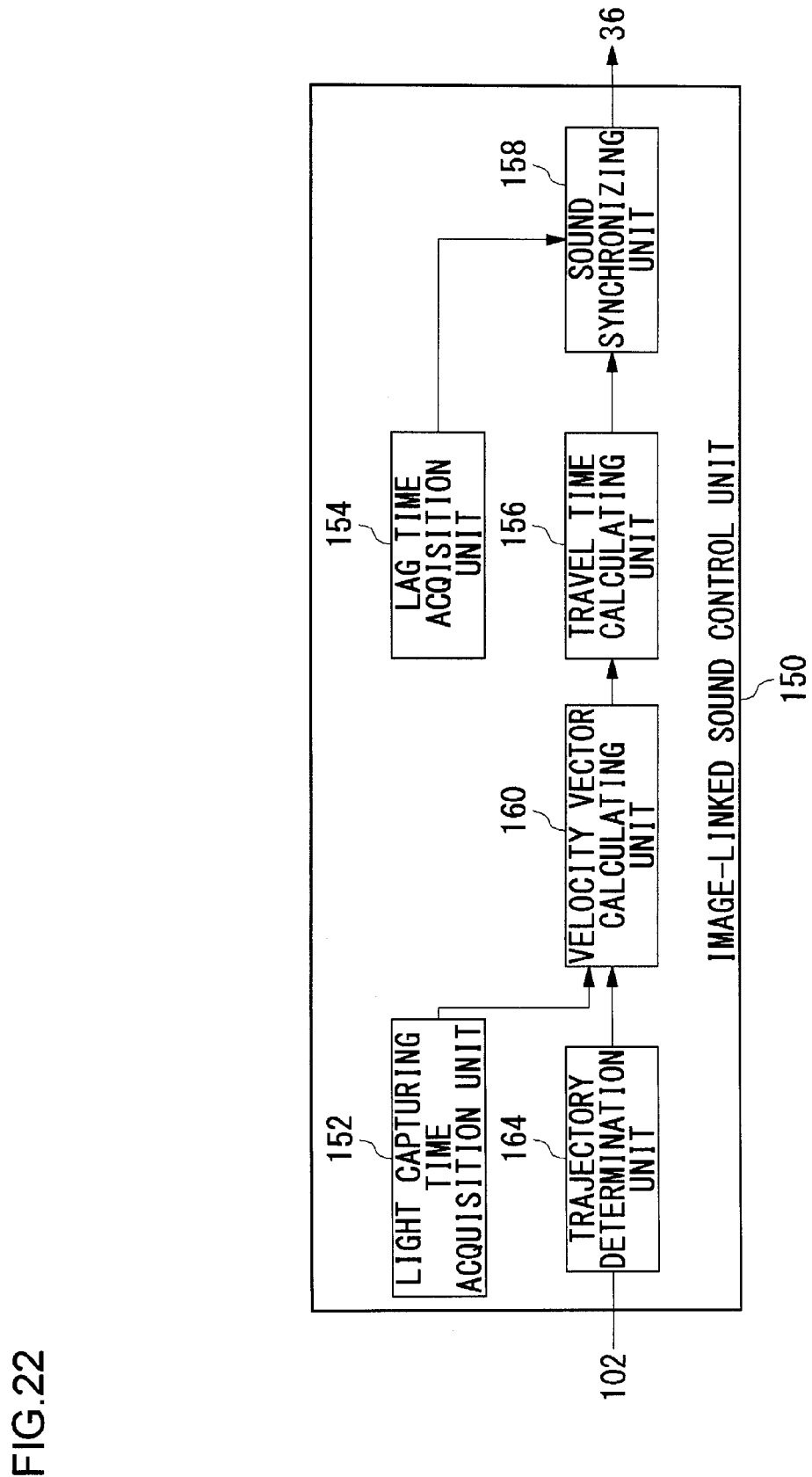
FIG. 22 is a diagram showing the configuration of the image-linked sound control unit in the embodiment 5.

FIG. 22 shows the configuration of the image-linked sound control unit 150 in the embodiment 5.

A light capturing time acquisition unit 152 acquires the light capturing time te of the image sensor 22 employed in the camera 20. The information may be input in advance or obtained by communicating with the camera 20.

A trajectory determination unit 164 receives a frame that includes the trajectory 75 from the image inverting unit 104 and determines a length p and direction of the trajectory included in the frame. The velocity vector calculating unit 160 calculates the velocity of the object v=p/te by using the length p of the trajectory and the light capturing time te.

The travel time calculating unit 156 calculates, as in the embodiment 4, the travel time tm for the object 74 to reach the assumable contact surface W by using the calculated velocity v and the distance li between the object 74 and the assumable contact surface W. In the example of FIG. 21, the assumable contact surface W is virtually set in the frame, and the distance li between the object 74 and the assumable contact surface W is calculated by analyzing the frame.

The lag time acquisition unit 154 and the sound synchronizing unit 158 are the same as described in the embodiment 4.

Figure 23:
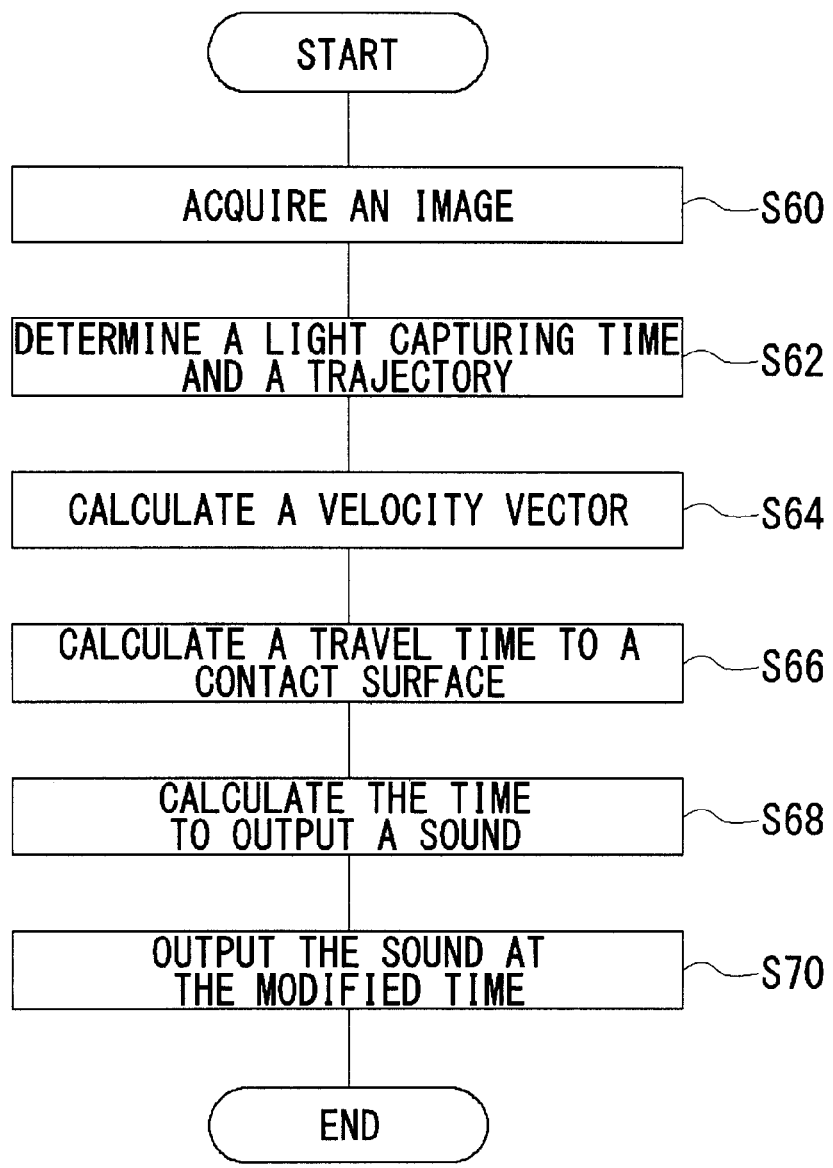
FIG. 23 is a flowchart of the process for outputting a sound, linking the sound to an image in the embodiment 5.

FIG. 23 is a flowchart of the process for outputting a sound while linking the sound to an image in the embodiment 5. First, the object 74 equipped with a light emitting device such as LED being moved is captured by the camera 20 (S60). The frame captured is transferred from the image acquisition unit 102 to the trajectory determination unit 164 in the image-linked sound control unit 150. The trajectory determination unit 164 detects the trajectory 75 generated by LED in the frame, determines the length and direction of the trajectory, and transfers the result to the velocity vector calculating unit 160 (S62). The velocity vector calculating unit 160 calculates the velocity of the object v by using the length and direction of the trajectory and the light capturing time of the image sensor (S64). Subsequently, the travel time calculating unit 156 calculates the travel time tm for the object to reach the contact surface by using the velocity v and the distance li to the assumable contact surface W (S66). The sound synchronizing unit 158 calculates the time for outputting a sound by using the time at which the frame used for calculating the velocity vector is captured as a starting point and withdrawing the lag time td from the travel time tm (S68). In accordance with the time to output a sound, a predetermined sound is output from the sound output unit 36 (S70). This allows the player 72 to hear the sound output from the speaker 42 substantially at the same time as the object reaches the assumable contact surface W.

As described above, according to the embodiment 5, the velocity of the object can be calculated by capturing the object being moved equipped with an illuminator and by using the light capturing time in the image sensor of a camera and the information on the trajectory of the illuminator in the frame output from the image sensor. The embodiment 5 defines that information on the velocity of an object is obtained not by differences in a plurality of frames but by determining the trajectory in an individual frame. However, this is effective under the condition that the illuminator attached to the object is to be lit up and that the trajectory is left to be seen in a frame.

Described above is an explanation based on the embodiments of the present invention. These embodiments are intended to be illustrative only and it will be obvious to those skilled in the art that various modifications to constituting elements and processes could be developed and that such modifications are also within the scope of the present invention. Optional combinations of the constituting elements described in the embodiments, and implementations of the invention in the form of methods, apparatuses, systems, computer programs, and recording mediums may also be practiced as additional modes of the present invention.

In the embodiments, the application that reflects a mirror image of a player and object on a display is explained. However, the moving image captured by a camera may not be reflected on a display.

In order to effectively execute an application as shown in the above embodiments, a camera that can capture a moving image at a adequately high frame rate, an image processing device with the ability of calculation and picturing for processing at such high frame rate, and a display capable of displaying images at high frame rate are preferably used in combination.

According to the present invention, a player can be notified both visually and aurally that his/her action is recognized.

What is claimed is:

1. An image-linked sound output method comprising:
    capturing an image of an object manipulated by a player by means of a camera;
    calculating a velocity vector by using both a difference in time required for capturing light between a first pixel and a last pixel in an image pick up device of the camera and a trajectory drawn by at least a part of a moving object in a frame captured by the camera;
    calculating a travel time required for the object to reach a contact surface with reference to the velocity vector; and
    adjusting a timing to output a sound in order for the player to hear the sound substantially at the same time as the object touches the contact surface with reference to the travel time.

2. The sound output method according to claim 1, wherein said adjusting a timing to output a sound includes referring to a lag time the sound takes to reach the player when outputting the sound produced by a contact of the object and the contact surface from a speaker placed apart from the player.

3. An image-linked sound output device comprising:
    a velocity vector-calculating unit operative to calculate a velocity vector of the movement of an object manipulated by a player moving toward a contact surface by using an image of the movement of the player captured by a camera;
    a travel time calculating unit operative to calculate a travel time required for the object to reach the contact surface by using the velocity vector and a distance between the object and the contact surface;
    a sound control unit operative to output from a speaker a predetermined sound when the object contacts the contact surface; and
    a lag time acquisition unit operative to acquire a lag time that the sound output from the speaker takes to reach the player,
    wherein the velocity vector-calculating unit calculates the velocity vector by using both a difference in time required for capturing light between a first pixel and a last pixel in an image pick up device of the camera and a trajectory drawn by at least a part of a moving object in a frame captured by the camera, and
    the sound control unit allows, based on the time obtained by subtracting the lag time from the travel time, the player to hear the sound substantially at the same time the object contacts the contact surface.

4. The sound output device according to claim 3, further comprising:
    an image output unit operative to display an image of the movement of a player captured by the camera on a display;
    an object detection unit operative to detect the object manipulated by the player from the image; and
    a display control unit operative to display an image of a character on the display so that an image of a mouth of the character is superimposed on the detected object and to change the mouth of the character in synchronization with the movement of the object, wherein
    the sound control unit outputs a sound from the speaker in accordance with the change in the mouth of the character.

5. The sound output device according to claim 4, wherein the object is a player's hand,
    the object detection unit detects the opening and closing of the hand, and
    the sound control unit outputs a sound in accordance with the movement of the opening and closing of the hand.

6. The sound output device according to claim 4, wherein the object is a player's mouth,
    the object detection unit calculates the velocity of the opening and closing of the player's mouth, and
    the sound control unit adjusts the timing to output a sound so that the opening and closing mouth and the sound are synchronized.

7. The sound output device according to claim 6, wherein the sound control unit adjusts the timing to output a sound by referring to the velocity of the opening and closing of the mouth and the lag time.

* * * * *